(12) United States Patent
Shinohara

(10) Patent No.: US 6,196,786 B1
(45) Date of Patent: Mar. 6, 2001

(54) CARGO TRANSPORTATION VEHICLE

(76) Inventor: Tadao Shinohara, 104 Higashi-Matsubara Haimu, 2-8-6, Hanegi, Setagaya-ku, Tokyo 156 (JP)

(*) Notice: Subject to any disclaimer, the term of this patent is extended or adjusted under 35 U.S.C. 154(b) by 0 days.

(21) Appl. No.: 08/981,522

(22) PCT Filed: Apr. 18, 1997

(86) PCT No.: PCT/JP97/01339

§ 371 Date: Mar. 11, 1998

§ 102(e) Date: Mar. 11, 1998

(87) PCT Pub. No.: WO97/39914

PCT Pub. Date: Oct. 30, 1997

(30) Foreign Application Priority Data

Apr. 24, 1996 (JP) .................................................. 8-102458
Feb. 21, 1997 (JP) .................................................. 9-052587
Feb. 21, 1997 (JP) .................................................. 9-052588

(51) Int. Cl.$^7$ .................................................. B60J 5/06
(52) U.S. Cl. .................................................. 414/498; 296/181
(58) Field of Search .................................. 414/495; 296/105, 296/100.03, 100.12, 181, 36

(56) References Cited

U.S. PATENT DOCUMENTS

| | | | |
|---|---|---|---|
| 1,405,485 | * 2/1922 | Callery | 296/181 X |
| 3,155,419 | * 11/1964 | Garson et al. | 296/181 |
| 3,186,756 | * 6/1965 | Saut et al. | 296/100.03 |
| 3,744,839 | * 7/1973 | Stoneburner | 296/189 X |
| 3,874,721 | * 4/1975 | Tuggle | 296/105 |
| 4,289,346 | * 9/1981 | Bourgeois | 296/105 |
| 4,547,014 | * 10/1985 | Wicker | 296/100.12 |
| 4,640,544 | * 2/1987 | McNamara et al. | 296/181 |
| 5,005,896 | * 4/1991 | Li | 296/100.12 X |
| 5,152,575 | * 10/1992 | DeMonte et al. | 296/105 |
| 5,251,950 | * 10/1993 | Bernardo | 296/100.03 X |
| 5,427,428 | * 6/1995 | Ericson et al. | 296/100.03 X |
| 5,538,313 | * 7/1996 | Henning | 296/105 X |

FOREIGN PATENT DOCUMENTS

| | | | |
|---|---|---|---|
| 3613284 | * 10/1987 | (DE) | 296/181 |
| 44-22244 | 9/1969 | (JP) . | |
| 63-2365 | 1/1988 | (JP) . | |
| 2-21295 | 6/1990 | (JP) . | |
| 3-61444 | 6/1991 | (JP) . | |
| 5-270273 | 10/1993 | (JP) . | |
| 5-270274 | 10/1993 | (JP) . | |
| 6-13919 | 2/1994 | (JP) . | |
| 6-144096 | 5/1994 | (JP) . | |
| 6-200678 | 7/1994 | (JP) . | |

* cited by examiner

Primary Examiner—Gregory A. Morse
(74) Attorney, Agent, or Firm—Armstrong, Westerman, Hattori, McLeland & Naughton

(57) ABSTRACT

A cargo transporting vehicle of the present invention can be changed in form by itself to the plain body type, the flap type, the container type or a compound of flap type and container type, depending upon the type of cargoes to be loaded thereon. With such a cargo transporting vehicle, the cargo storage unit can be moved and freely loaded and unloaded. The cargo storage unit includes a top unit, intermediate units, and an end unit, and the storage unit is loaded on the cargo loading platform of the vehicle, such as the rear deck of a truck. By loading a flap unit inside of the cargo storage unit, the cargo storage chamber can be double-structured. With this cargo transporting vehicle, the cargo storage chamber can be easily assembled and folded. The cargo transporting vehicle minimized the need for idle running or wasted return trips resulting in an improvement in operation efficiency and transportation efficiency as well as an improvement in workability in loading and unloading of cargoes.

13 Claims, 42 Drawing Sheets

CARGO TRANSPORTATION VEHICLE

FIELD OF THE INVENTION

The present invention relates to motor-trucks, truck-trailers, and other cargo transporting vehicles, the rear deck of which can be changed into those of various forms to suit the types of cargoes to be loaded thereon.

BACKGROUND OF THE INVENTION

Motor-trucks, truck-trailers, and other cargo transporting vehicles are available in various types; for example, the plain body type, the flap type, with which side walls are attached to the plain body type, and the container type, with which the sides, the rear and the ceiling are covered. However, these types can be used only as a single type, and a certain type of vehicle cannot be changed into another type of vehicle for use.

Therefore, a vehicle of the type suitable for the types of cargoes to be loaded is selected for use. Thus, for cargoes which are large in size per piece, and which have a definite shape, such as the shape of steel articles, round bars, and other long steel products, and timbers, the plain body type is used. For cargoes which have an indefinite shape, such as scraps and powdery articles, the flap type, i.e., the type with which cargoes can be loaded and unloaded from the top and loss of cargoes can be prevented, is used. To load a number of relatively small box-like articles, the container type, i.e., the type which allows loading unloading from the side by means of a fork, is used.

Thus, conventionally, the type of vehicle to be used is determined to suit the types of cargoes to be loaded. For example, assuming that various forms of cargoes are transported between the points A and B, when large cargoes having a definite shape are to be transported from the point A to B, the plain body type of vehicle is used. When cargoes having an indefinite shape are to be transported from the point B to A, the flap type vehicle or the container type vehicle is used. Therefore, various types of vehicles must always be prepared. In addition, because each vehicle is empty on the return trip, the operation efficiency and transportation efficiency for the vehicle is low, and the driver of the vehicle must make a wasted run on the return trip.

For example, when long steel products are arranged on the rear deck, and transported with a vehicle of the plain body type, the rear deck often makes the return trip with no cargo, if no large-sized cargoes are ready to be transported after the cargo is transported to its destination and unloaded. This results in poor transportation efficiency and an overload beyond the limit on the Road Traffic Act, which is caused by loading the largest possible quantity of cargoes when the cargoes are ready to be loaded. The poor transportation efficiency also results in transportation working hours beyond the limit of the regulation, and an increase in traffic jams.

The purpose of the present invention is to solve these problems and offer cargo transporting vehicles of a form which can be changed on site between the plain body type, the flap type, and the container type, depending upon the types of cargoes to be loaded. The cargo transporting vehicles of the present invention eliminate the need for preparing various vehicles to suit the types of cargoes to be loaded. The need for idle running or wasted return trips of the vehicle can be minimized, resulting in an improvement in operation efficiency and transportation efficiency, and an improved workability in transportation.

E Another purpose of the present invention is to offer cargo transporting vehicles which can be used not only as the plain body type, the flap type, and the container type, but also the compound container and flap type.

SUMMARY OF THE INVENTION

The present invention has been made to solve the above-mentioned problems of the prior art. The cargo transporting vehicles of the present invention are characterized in that a cargo storage unit, which is movable and which can be freely loaded and unloaded, is loaded on the rear deck of a vehicle and the cargo platform of a truck (hereinafter referred to as "rear deck").

With the present invention, a configuration as described above is taken and thus, the cargo storage chamber can be easily assembled and folded, and the cargo transporting vehicle can be changed into various forms for use.

For example, by folding the cargo storage unit and bringing it to the front of the rear deck or completely removing it from the rear deck, the cargo transporting vehicle of the present invention can be used as a plain body type vehicle. When the cargo storage unit, which is a flap unit, is assembled, the cargo transporting vehicle of the present invention can be used as a container type vehicle.

Another cargo transporting vehicle of the present invention is characterized in that a container unit, which is movable and which can be freely loaded and unloaded, is loaded on the cargo loading platform, such as the rear deck of a vehicle and the truck, and a flap unit is loaded inside the container unit to provide a double structured cargo storage unit.

With this cargo transporting vehicle, by folding the container unit and the flap unit inside the container unit and bringing the container and flap units to the front of the rear deck or completely removing the container and flap units from the rear deck, the cargo transporting vehicle of the present invention can be used as a plain body type vehicle. When only the inside flap unit is assembled, the cargo transporting vehicle of the present invention can be used as a flap type vehicle. On the other hand, with only the outside container unit being assembled, a container type vehicle is provided. When both of the outside container unit and the inside flap unit are assembled, the cargo transporting vehicle of the present invention can be used as a compound vehicle of both container type and flap type.

BRIEF DESCRIPTION OF THE DRAWINGS

FIG. 1 is a side view of the truck-trailer in which the flap unit is folded.

FIG. 2 is a plan view of the truck-trailer in which the flap unit is folded.

FIG. 3 is a side view of the truck-trailer in which the flap unit is assembled.

FIG. 4 is a plan view of the truck-trailer in which the flap unit is assembled.

FIG. 5 is a rear view of the truck-trailer in which the flap unit is assembled.

FIG. 6 is a cross-sectional view along line A—A of FIG. 3.

FIG. 7 is a plan view of the flap unit to be loaded on the truck-trailer.

FIG. 8 is an example of intermediate unit of the flap unit.

FIG. 9 is a second example of intermediate unit of the flap unit.

FIGS. 10 and 11 show how the unit is engaged with the guide member.

FIG. 12 is a plan view of the end unit of the flap unit.

FIG. 13 is a plan view of the flap unit in the folded state.

FIG. 14 is a side view of the motor-truck in which the container unit is assembled.

FIG. 15 is a plan view of the motor-truck in which the container unit is assembled.

FIG. 16 is a side view of the motor-truck in which the container unit is folded.

FIG. 17 is a plan view of the motor-truck in which the container unit is folded.

FIG. 18 is a side view of the motor-truck in which side walls and a roof are opened after the container unit is assembled.

FIG. 19 is a plan view of the motor-truck in which side walls and a roof are opened after the container unit is assembled.

FIG. 20 is a plan view of the container unit to be loaded on the motor-truck.

FIG. 21 is a plan view of the container unit in which a roof is opened.

FIG. 22 is a bird's eye view of the container unit in which side walls and a roof are opened.

FIG. 23 is a plan view of the container unit in which a side wall is opened.

FIG. 24 is a plan view of the side wall section of the container unit when the side walls are closed.

FIG. 25 is a plan view of the side wall section of the container unit when a side wall is swung into other positions.

FIG. 26 is a plan view of the container unit in which doors are opened.

FIG. 27 is a plan view showing another example of the container unit in which doors are opened.

FIG. 28 gives a plan view showing the container unit which is being folded.

FIG. 29 is a plan view of the motor-truck in which the container unit is folded.

FIG. 30 is a plan view of the motor-truck in which the container unit is drawn out halfway along the rear deck.

FIG. 31 is a plan view of the motor-truck in which the container unit is assembled.

FIG. 32 is a plan view of the top unit portion of the container unit.

FIG. 33 is a side view of the top unit portion of the container unit.

FIGS. 34 to 37 show how adjacent units are connected.

FIG. 38 is a plan view of the motor-truck in which the container unit and the inside flap unit are folded.

FIG. 39 is a plan view of the motor-truck in which the container unit is assembled halfway after the flap unit is assembled.

FIG. 40 is a plan view of the motor-truck in which the container unit is assembled.

FIG. 41 is a plan view of the motor-truck in which an intermediate unit of the container unit is unfolded.

FIG. 42 is a plan view of the intermediate unit in FIG. 41.

FIG. 43 is a side view of the intermediate unit.

FIG. 44 is a front view of the intermediate unit.

FIG. 45 is an enlarged view showing the portion "a" of FIG. 44.

FIG. 46 is a plan view showing a flap intermediate unit in the unfolded state that is to be loaded inside of the container unit.

FIG. 47 is a plan view showing the flap intermediate unit in FIG. 46 when it is swung.

FIG. 48 is an enlarged partial side view showing how the container intermediate unit and the flap unit are engaged with the rear deck.

FIG. 49 is a rear view from the motor truck showing how the container intermediate unit and the flap unit are engaged with the rear deck.

FIG. 50 is a plan view of the truck-trailer in which the container unit and the inside flap unit are folded.

FIG. 51 is a plan view of the truck-trailer in which the container unit is assembled halfway, after the flap unit is assembled.

FIG. 52 is a plan view of the truck-trailer in which the container unit is assembled.

FIG. 53 is an enlarged partial side view showing how the container intermediate unit and the flap unit are engaged with the rear deck.

FIG. 54 is a rear view from the motor truck showing how the container intermediate unit and the flap unit are engaged with the rear deck.

FIG. 56 is a plan view of the truck-trailer in which the container unit is assembled.

FIG. 57 is a side view of the truck-trailer in which the container unit is folded.

FIG. 58 is a schematic drawing showing how the container intermediate unit is engaged with the truck as viewed from the rear of the truck trailer.

FIG. 59 is a plan view of the truck-trailer in which the container unit and the inside flap unit are folded.

FIG. 60 is a side view of the truck-trailer in which the container unit is assembled.

FIG. 61 is a plan view showing states of the side walls of the container unit.

FIG. 62 is a plan view showing states of the ceilings of the container unit.

FIG. 63 is a schematic drawing of the truck-trailer in which the container unit and the inside flap unit are folded as viewed from the top.

FIG. 64 is a schematic drawing showing how the container unit is unfolded.

FIG. 65 is a schematic drawing showing how the inside flap unit is unfolded after the container unit is unfolded.

PREFERRED EMBODIMENT OF THE INVENTION

Here is a description of the preferred embodiment of the present invention.

With the present invention, the cargo containing section unit can be comprised of a combination of a top unit, which is installed on the driver's seat side, an end unit, which is installed at the rear of the rear deck, and an arbitrary number (including zero) of intermediate units, which are installed between the top unit and the end unit. Each unit consists of two pillars located at both side ends of the rear deck, and a beam connecting between the pillars. This unit may be in the shape of a flattened, inverted U by connecting the top ends of the two pillars with one beam, or made rectangular by connecting the two pillars with top and bottom beams. Normally, in the bottom portion of the pillar, parts to be engaged with the guide member, such as wheels, bearings, and gears, are provided.

The top unit, to be located at the front of the rear deck (on the driver's seat side), may be fixed at the front of the rear deck or may be made movable so that the top unit can be completely removed, together with the other units, from the rear deck.

With one aspect of the present invention, a flap unit can be formed on the rear deck of a cargo transporting vehicle with the cargo containing unit. When the cargo containing unit is to be made a flap unit, each unit can be formed so as to have two pillars to be located at both side ends of the cargo loading platform with a beam connecting the pillars. The intermediate units can be configured so that they have a side wall, first end of the side wall is connected to the pillar so that the side wall can be freely swung, and the second end of the side wall can be engaged with the pillar of the adjacent unit, and the side walls of adjacent units are connected to one another in sequence through the pillar of the adjacent unit to form a flap unit.

With another aspect of the present invention, a container unit can be formed on the rear deck of a cargo transporting vehicle with the cargo containing unit.

With the container unit, the walls can be formed with boards attached to the pillars and/or the beams of the units so that the walls can be freely swung. The walls of the container unit may be formed with shutters accommodated in the units. Alternatively, the walls may be formed with a combination of boards and shutters. For example, a configuration can be selected in which the side walls of the container unit are formed with boards and the ceilings are formed with shutters, or conversely, a configuration in which the side walls of the container unit are formed with shutters and the ceilings are formed with boards, or another appropriate configuration can be selected. In the present invention, the shutter means is a member which can be wound up and unwound and which is made of such a material as any of a light metal, a reinforced plastic, and a cloth.

Figure 39:
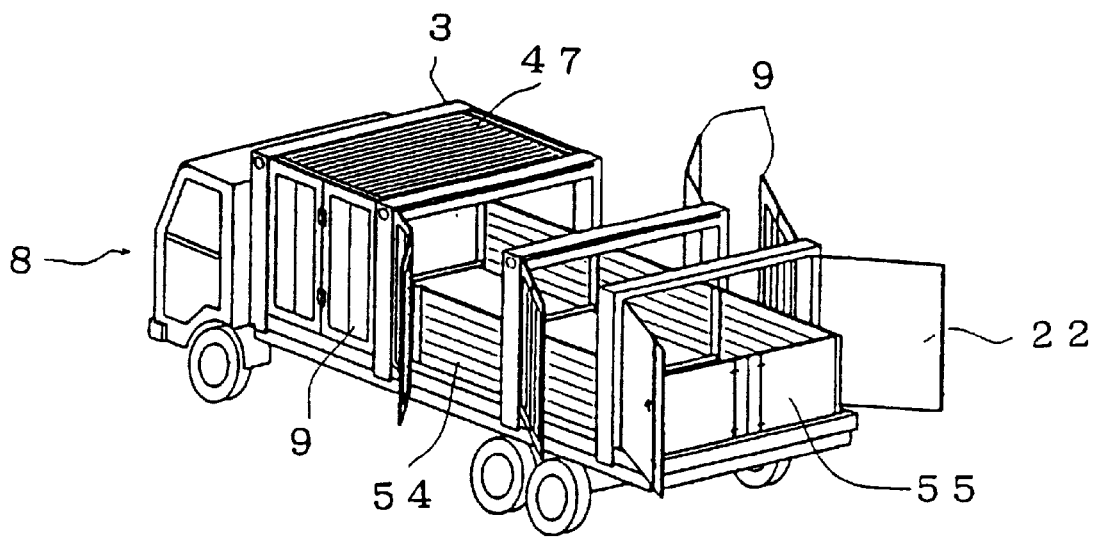

To form the walls of the container unit with boards, the boards are attached to the pillars and/or the beams of the units so that the walls can be freely swung. For example, to form the side walls of the container unit with boards, a first end of the board is connected to the pillar of the unit so that the side wall can be freely swung, a second end of the board is configured so that the second end of the board can be engaged with the pillar of an adjacent unit, and the side walls are connected to one another in sequence through the pillar of the intermediate unit to form the side walls of the container unit. To form the ceilings of the container unit with boards, either the board is attached to the beam connecting the tops of the pillars of the unit, or the board forming the ceiling is installed between and engaged to the adjacent units so that the board can be removed. Although the side wall, to be installed between pillars, may be formed with a single board, as shown in FIG. 39, the side wall may be formed by connecting more than one boards, with such parts as hinges, so that the side wall can be freely folded. These boards may be configured so that a part of the board provides a door or window which can be freely opened and closed.

To form the walls of the container unit with shutters, the shutters are accommodated in the top unit, and the other units are used, for example, as a shutter guide and holding member. For example, to form all the walls of the container unit with shutters, a shutter case accommodating a shutter is provided on the top and both sides of the top unit, and connecting members are used to connect between adjacent units. The connecting members, the intermediate units, and the end unit can be used as a shutter guide and holding member. The end unit is provided with a board forming the rear wall of the cargo chamber or a door, but the shutter can also be extended to provide the rear wall.

Figure 34:
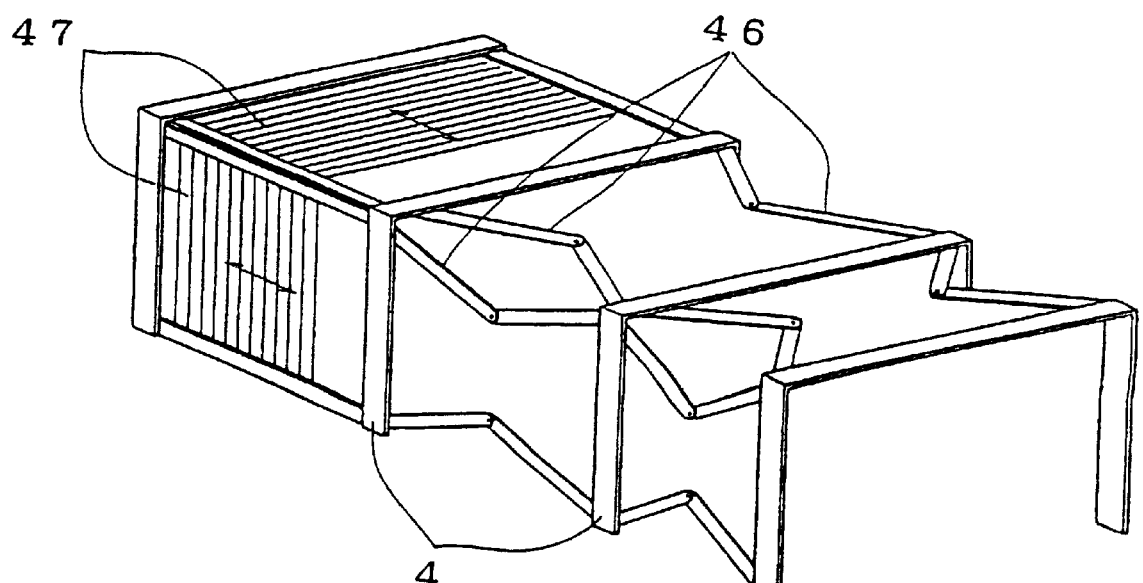
Figure 35:
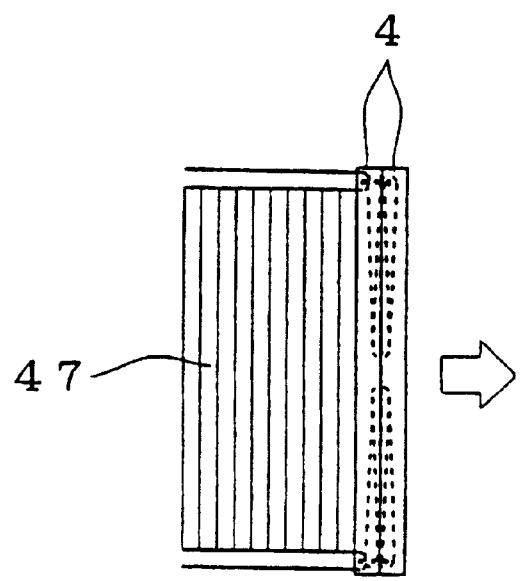
Figure 36:
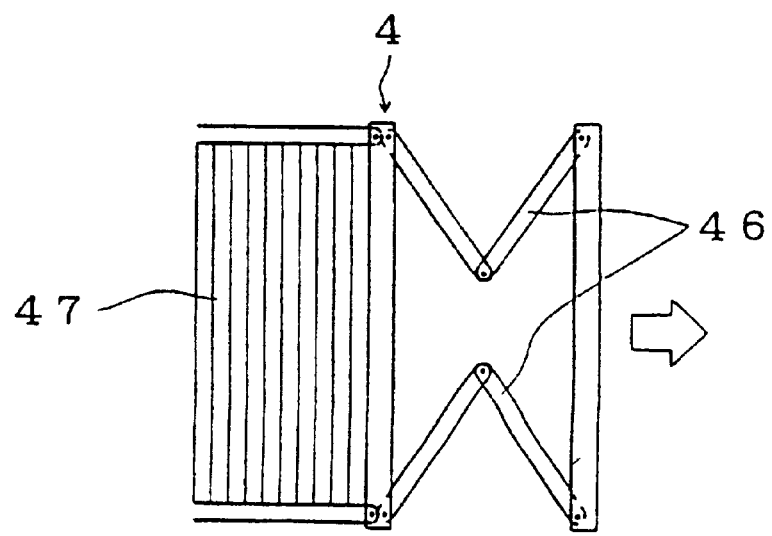
Figure 37:
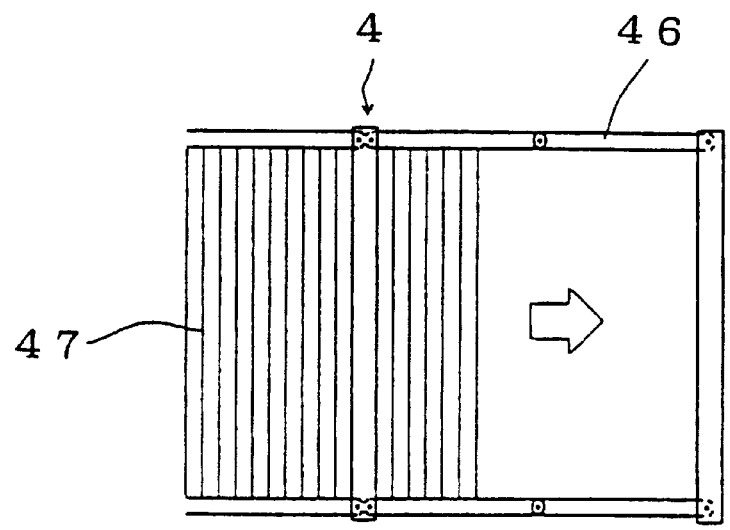

The connecting members which connect adjacent units may be configured so that the connecting member can be freely folded, as shown in FIG. 34. Alternatively, the connecting member may be formed with a bar having a first end connected to the pillar so that the connecting member can be freely swung, and a second end of the bar engages the pillar of the adjacent unit by means of an engaging member.

To form a part of the walls of the container unit such as to form only the ceiling with a shutter, a shutter case is provided on the top of the top unit. In addition, first ends of the boards forming the side walls of the container unit are connected to the top unit and the intermediate units so that the side walls can be freely swung, and second ends of the side walls are configured so that the side walls can be engaged with the adjacent pillars. The side walls are connected to one another in sequence through the pillar of the intermediate unit to form the side walls of the container unit.

The ceiling of the container unit may be formed with boards and the side walls may be formed with shutters.

The number of intermediate units to be installed, and either the size of the connecting members for connecting adjacent units or the boards forming the side walls, can be appropriately set to suit to the size of the vehicle. When the rear deck of the vehicle is small, as is the case with a small-sized motor-truck, the intermediate units can be omitted, and the top unit and the end unit may be used to form a container unit.

Figure 38:
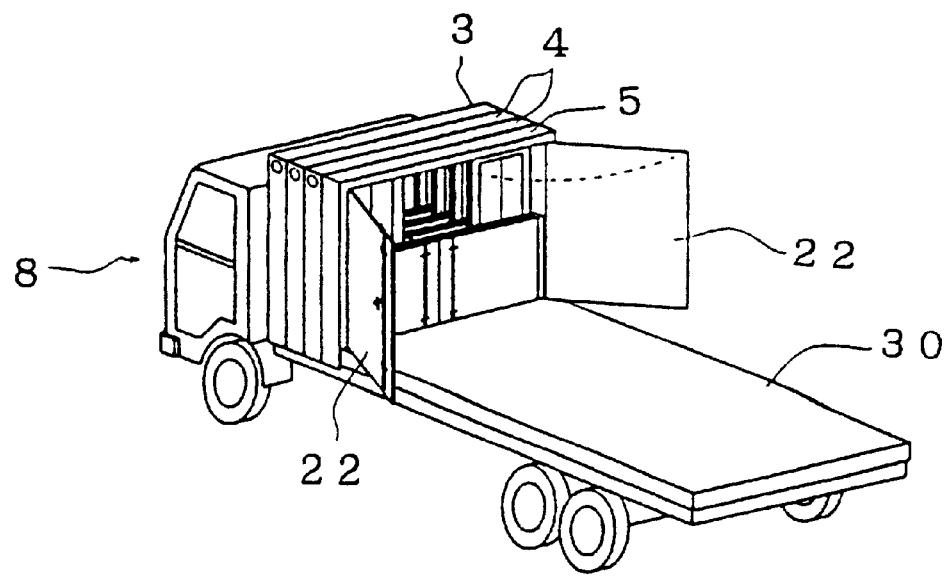
FIGS. 38 to 49 show an example in which a container unit is loaded on the rear deck of a motor-truck, and a flap unit is loaded inside the container unit to provide a double structured cargo containing section.
Figure 40:
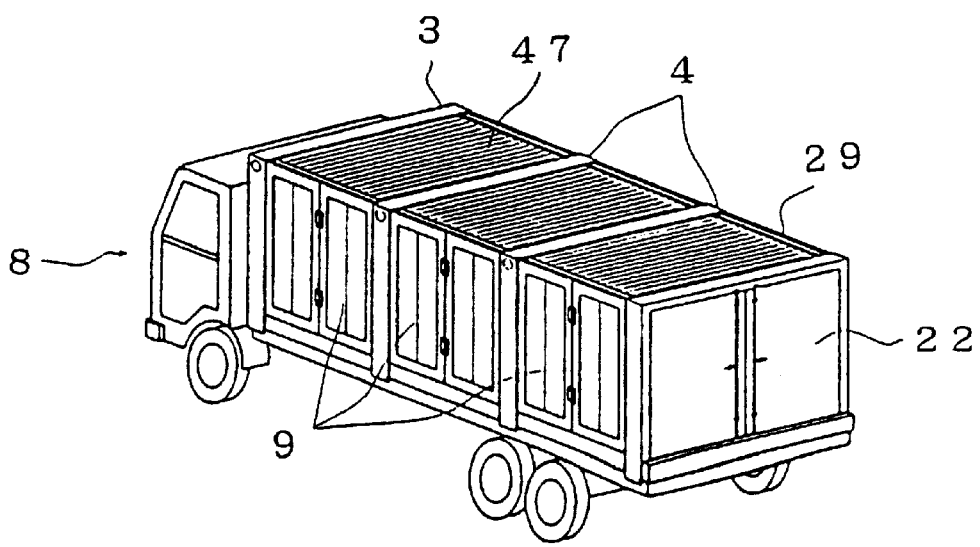

As shown in FIGS. 38 to 40, not only the top unit, but also the intermediate units can be provided with a shutter case to accommodate a shutter.

With another aspect of the present invention, a flap unit can be loaded inside of the above-mentioned container unit to provide a double-structured cargo containing section. The flap unit may be the same as a flap unit fixed on a rear deck of a conventional vehicle. To form a flap unit, a flap unit which can be freely folded in either the crosswise or longitudinal directions may be loaded on the rear deck so that the flap unit can be moved. When a movable flap unit is used to provide a double-structured cargo containing section, folding both of the outside container unit and the inside flap unit and bringing them together to the front of the rear deck, allows the cargo transporting vehicle to be used as a plain body type vehicle. When the outside container unit is formed with the inside flap unit being folded and brought to the front of the rear deck, the cargo transporting vehicle can be used as a container type vehicle. Conversely, when the inside flap unit is formed with the units constituting the outside container unit being folded and brought together to the front of the rear deck, the cargo transporting vehicle can be used as a flap type vehicle. Further, when the outside container unit and the inside flap unit are both formed, the cargo transporting vehicle can be used as a compound vehicle of container type and flap type. This compound vehicle can conveniently transport vegetables, daily necessaries, scraps, powdery cargoes, and other articles which require a certain degree of strength of the rear deck side walls and must not be moistened by rain.

With the present invention, to load the units on the rear deck of the cargo transporting vehicle so that the units can be freely moved, guide members are provided on the rear deck, and these guide members are engaged with the units. The guide members include such a part as any one of a rail, rack, and grooved member. The guide members are normally installed at both side ends of the rear deck, but the guide members may be installed in the central area of the rear deck. The units are provided with such rotating members as wheels and bearings or gears, which are engaged with the guide members.

Figure 49:
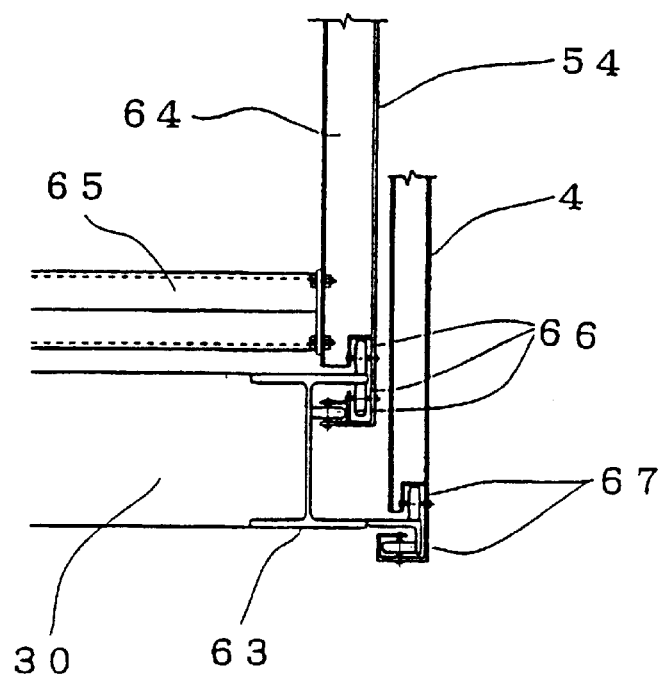
Figure 54:
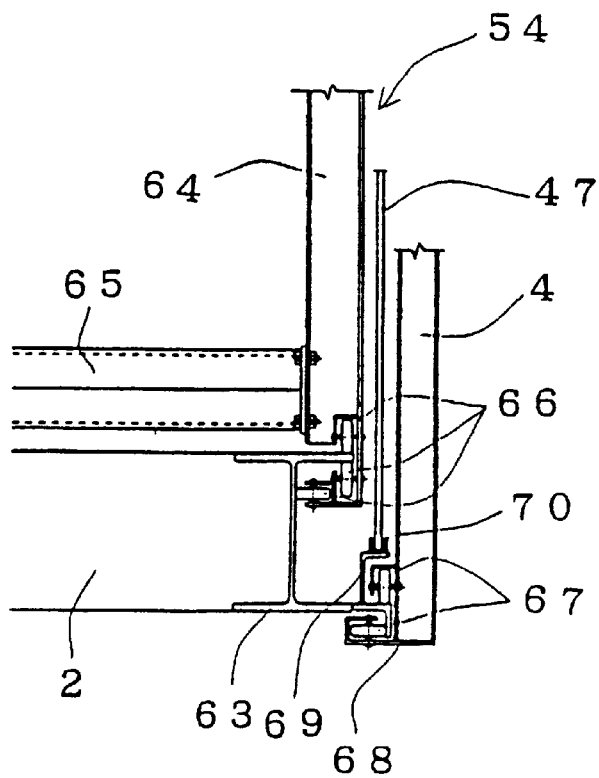

To load the flap unit inside of the container unit so that flap unit can be moved, another guide member is provided inside of the guide member engaged with the container unit so that the container unit can be moved, and the flap unit is engaged with this guide member so that the flap unit can be moved. As such guide members, a double-rail as shown in FIGS. 49 and 54 can be used, for example.

The flap unit consists of a top unit, any number (including zero) of intermediate units, and an end unit. It is desirable that each unit be provided with two pillars to be located at both side ends of the rear deck and a beam connecting he pillars in the bottom portion so that each unit has a necessary strength.

To the top unit and the intermediate units of the flap unit, first ends of the boards forming the side walls of the flap unit are connected so that the side walls can be freely swung, and second ends of the side walls are configured so that the side walls can be engaged with the adjacent pillars. The side walls are connected to one another in sequence through the pillar of the unit to form the side walls of the flap unit. The rear wall members are attached at the bottom of the end unit so that the rear wall members can be swung until they are flush with the rear deck.

The number of intermediate units and the size of the side wall members connecting the adjacent units can be appropriately set to suit the size of the vehicle.

Next, by referring to the drawings, the examples of the present invention will be described in more detail although the present invention is not limited by these examples.

EXAMPLE 1

Figure 7:
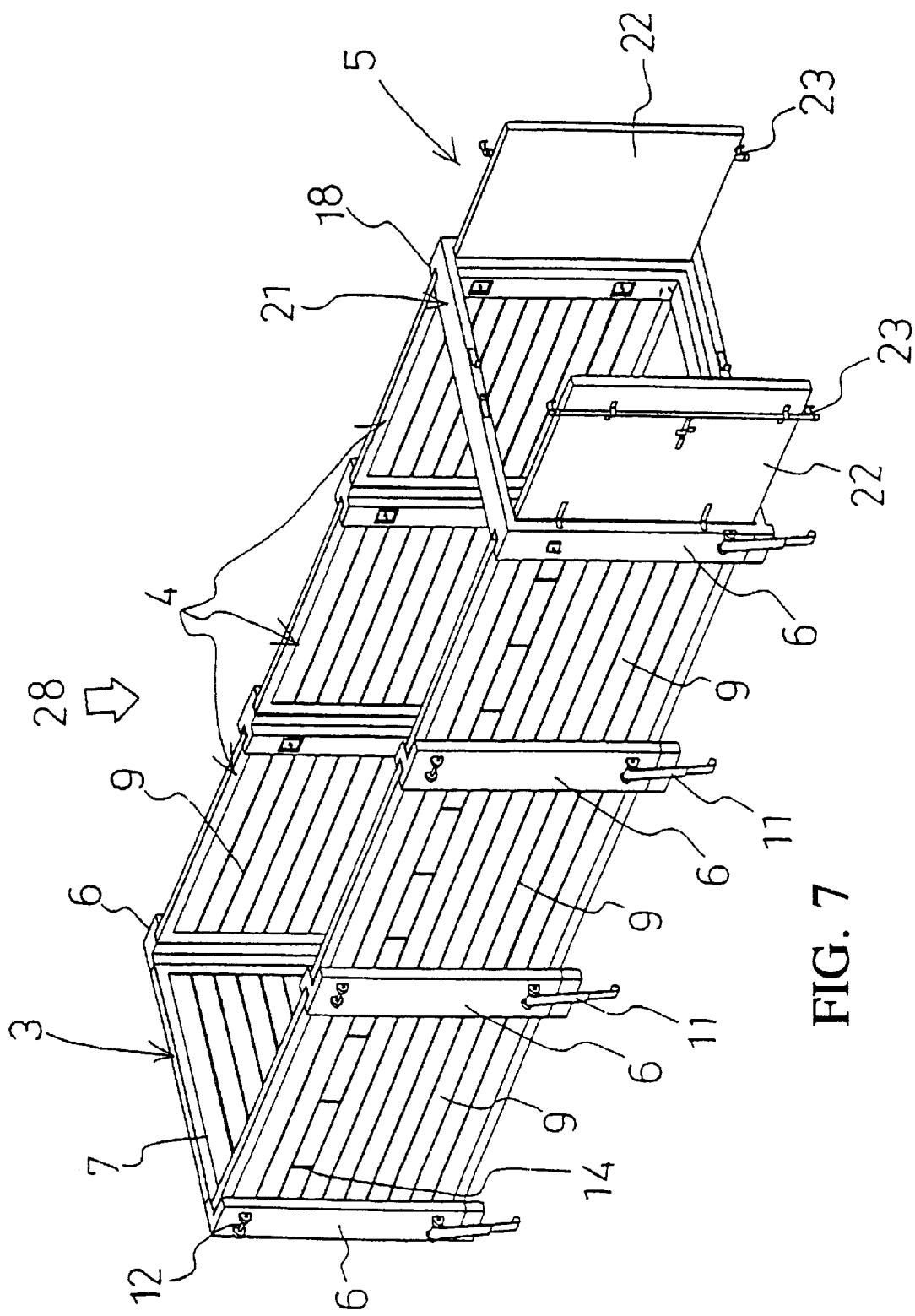
Figure 8:
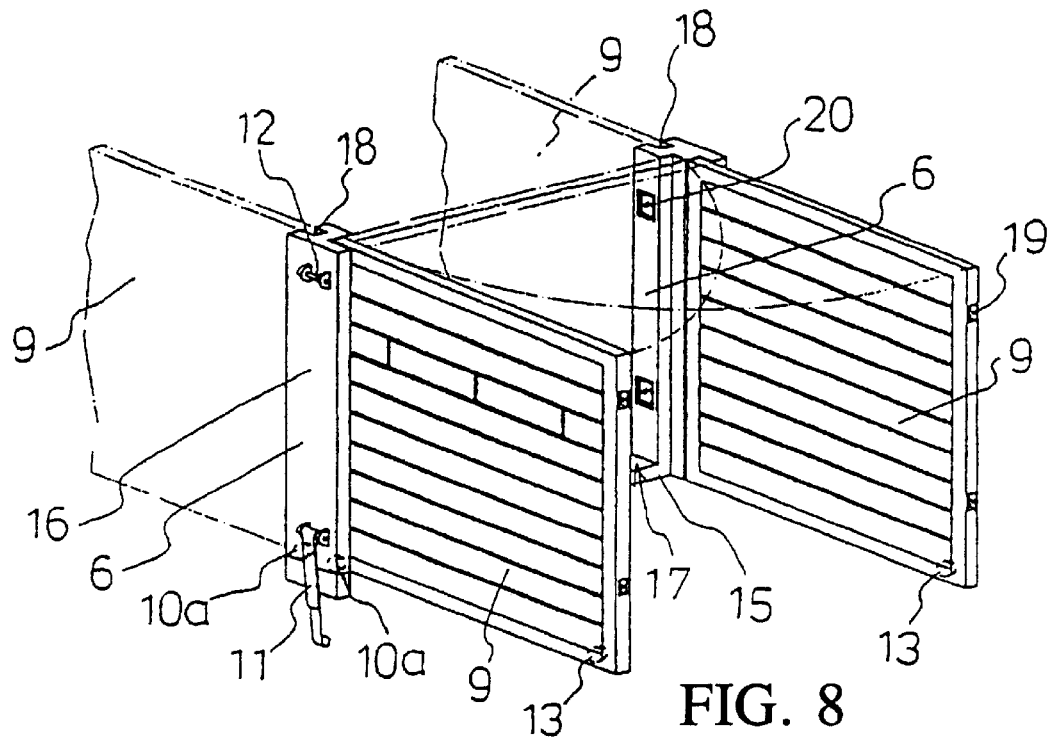
Figure 9:
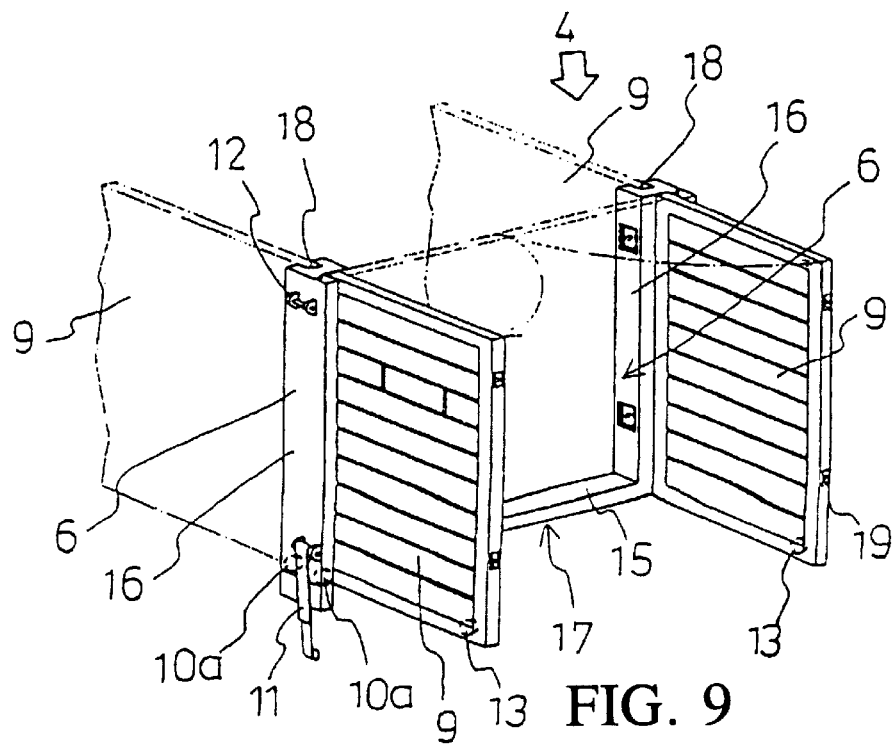

FIGS. 1 to 13 illustrate an example in which the present invention is applied to a truck-trailer. With respect to this example, a flap unit 28 is mounted as a cargo containing unit on the truck 2 of a truck-trailer 1 so that it can be freely moved along the longitudinal direction of the truck 2. As shown in FIG. 7, the flap unit 28 consists of a top unit 3, a number of intermediate units 4, and an end unit S. The number of intermediate units 4 is determined depending upon the length of the truck 2. As shown in FIGS. 8 and 9, the lengths of the units 3, 4, and 5 are determined depending upon the length of the truck 2 and other specifications.

The constructions of the units 3, 4, and 5 will be described by referring to FIG. 7. The top unit 3 is installed in the front portion of the truck 2 of the truck-trailer 1. A fixed wall 7 is fixed between two opposing pillars 6 each having an L-shaped cross-section. A first end of a side wall 9 for forming a flap is mounted to each pillar 6 with hinges so that side wall can be freely swung.

In this case, the transverse width of the side wall 9 is designed to be equal to the distance between the pillars 6, and thus two side walls 9 are layered with the fixed wall 7 in the state of storage. The side walls 9 are opened at right angles to the fixed wall 7 in the state of use as a flap (see FIG. 4), and in this state, the inside of the pillar 6, having an L-shaped cross-section serves as a stopper to prevent the side wall 9 from being swung through an angle over 90 degrees.

A material having a strength, such as iron, is used as the material for the pillar 6. Although the side wall 9 is generally made of aluminum or another light metal, for heavy cargoes, the side wall 9 may be made of a material having more strength, such as iron.

Figure 10:
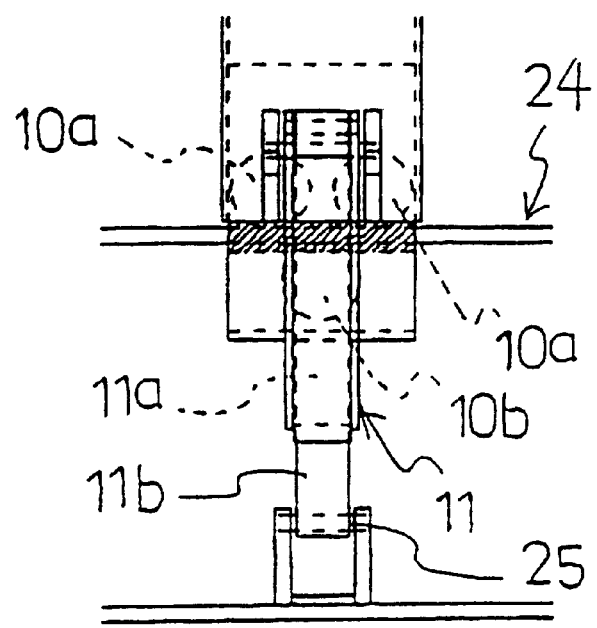
Figure 11:
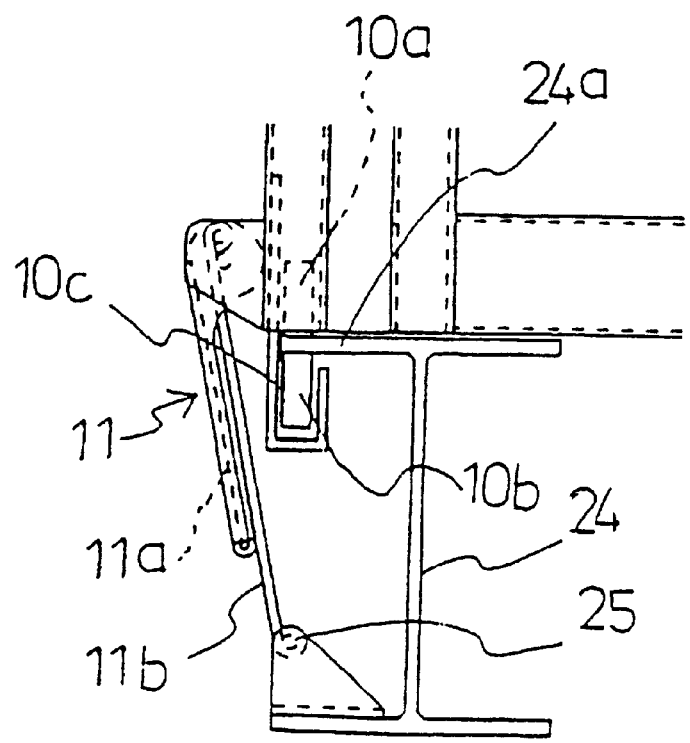

A wheel 10 is provided on the bottom portion of the pillar 6 to move the pillar 6 onto the truck 2, and a fixing fitting is mounted on the bottom portion to fix the pillar 6 to the truck 2. The wheel 10, for example, as shown in FIGS. 10 and 11 may include three wheels, i.e., two upper wheels 10a accommodated in the upper portion of a wheel support 10c, the wheel support 10c having a lower portion which is bent upwardly at right angles, and one lower wheel 10b in the bent area of the lower portion. A part of the upper flange 24a of a steel I beam member is sandwiched between the upper wheels 10a and the lower wheel lob with the steel I-beam member forming a side edge of the truck 2 to function as a rail 24.

The tail of the rail 24 protrudes rearwardly of the body of the truck 2 to provide some play for moving the units 3, 4, and 5. The rail 24 is not limited to that as stated above; grooves can be formed on the truck 2 to accommodate separate rail materials therein.

The fixing fitting 11, for example, as shown in FIGS. 10 and 11, includes an operation lever 11a, which can be freely turned in the vertical direction, and a fixing lever 11b, which is clamped and fixed by the operation lever 11a and which has an end formed into a hook. An engaging pin 25 is provided on the rail 24 and the hooked end of the fixing lever 11b engages the engaging pin 25.

In FIGS. 7 to 9, a bar-like fixing fitting 12 is provided in the upper portion of the pillar 6, and the bar-like fixing fitting 12 can be used to fix a sheet for covering the top opening of the flap unit 28. A universal wheel 13 is attached to the bottom end of the side wall 9. A bar-like member is mounted in the upper portion of the side wall 9 to act as a hook catch 14 for the hook of a sheet rubber band.

Next, the intermediate unit 4 will be described by referring to FIGS. 8 and 9. The intermediate unit 4 is made of a material having a strength, such as iron, and the intermediate unit 4 includes a flattened U-shaped frame 17 and a stanchion 16 extends vertically from both ends of a connecting beam 15 at the bottom, and said stanchion 16 serves as a pillar 6. The pillar 6 has a nearly L-shaped cross-section in similar to that of the top unit 3, and a side wall 9 is mounted to the inside of the L-shaped section member with hinges so that the side wall can be freely swung.

A groove is vertically formed in the outside surface of the pillar 6 having an L-shaped cross-section opposite to the location where the side wall 9 is mounted. Hook catches 19 are provided on the end of the side wall 9 to anchor the side wall 9 in the state of side wall storage. Hook-like fixing fitting 20 are provided on the opposed surfaces of the inside of the side walls 9 and the hook catches 19 are engaged with the hook-like fixing fittings 20. The configuration providing such components as a wheel 10, a fixing fitting 11, a fixing fitting 12, a universal wheel 13, and a hook catch 14 is the same as that for the top unit 3. The size of the side wall 9 and the materials of both the side wall 9 and the pillar 6 are the same as those for the top unit 3.

Figure 12:
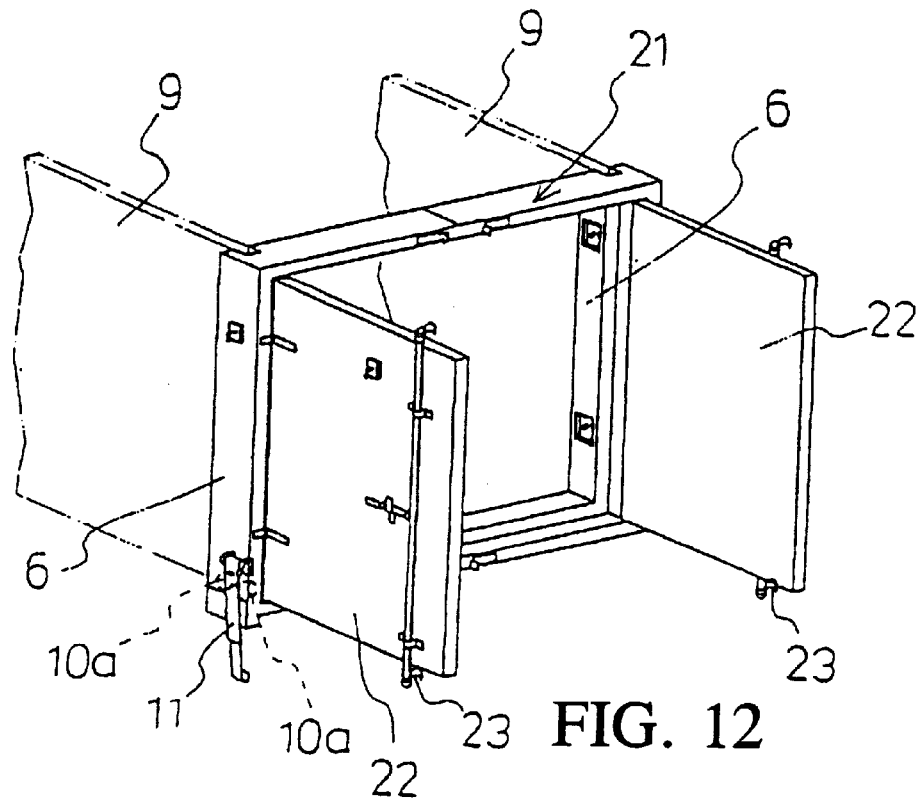

Next, the end unit 5 will be described. With the end unit 5, as shown in FIGS. 7 and 12, the stanchion portion of a rectangular metallic frame 21, made of such a material as iron, is used as the pillar 6. To the inside of this pillar 6, a light metal door 22, made of such a material as aluminum is mounted with hinges so that the door 22 can be freely swung. The size of the door 22 is made equal to the inside dimension of the frame 21. The door 22 may be formed as French doors as shown in FIG. 7, or the door 22 may be a single swing door.

As with the pillar 6 of the intermediate unit 4, the pillar 6 of the end unit 5 is also provided with a groove 18 into which the adjacent side wall 9 is fitted. A fixing fitting 23 is provided at the top and bottom ends of the door 22. The configuration providing such components as a wheel 10, a fixing fitting 11, and a hook catch 14 is the same as that for the top unit 3.

Next, how to use the flap unit will be described. For example, when a plain body vehicle is required on the first leg of a round trip or the outward trip, and a flap type vehicle is required on the second leg of the round trip or the return trip, depending upon the type of the cargo to be loaded, the flap unit 28 is loaded. The top unit 3, the intermediate units 4, and the end unit 5 of the flap unit 28 are loaded on the truck 2 by engaging them with the rail 24 on the side of the truck 2 of the truck-trailer 1 through the wheel 10 so that each of the units can be freely moved in the horizontal direction.

Figure 1:
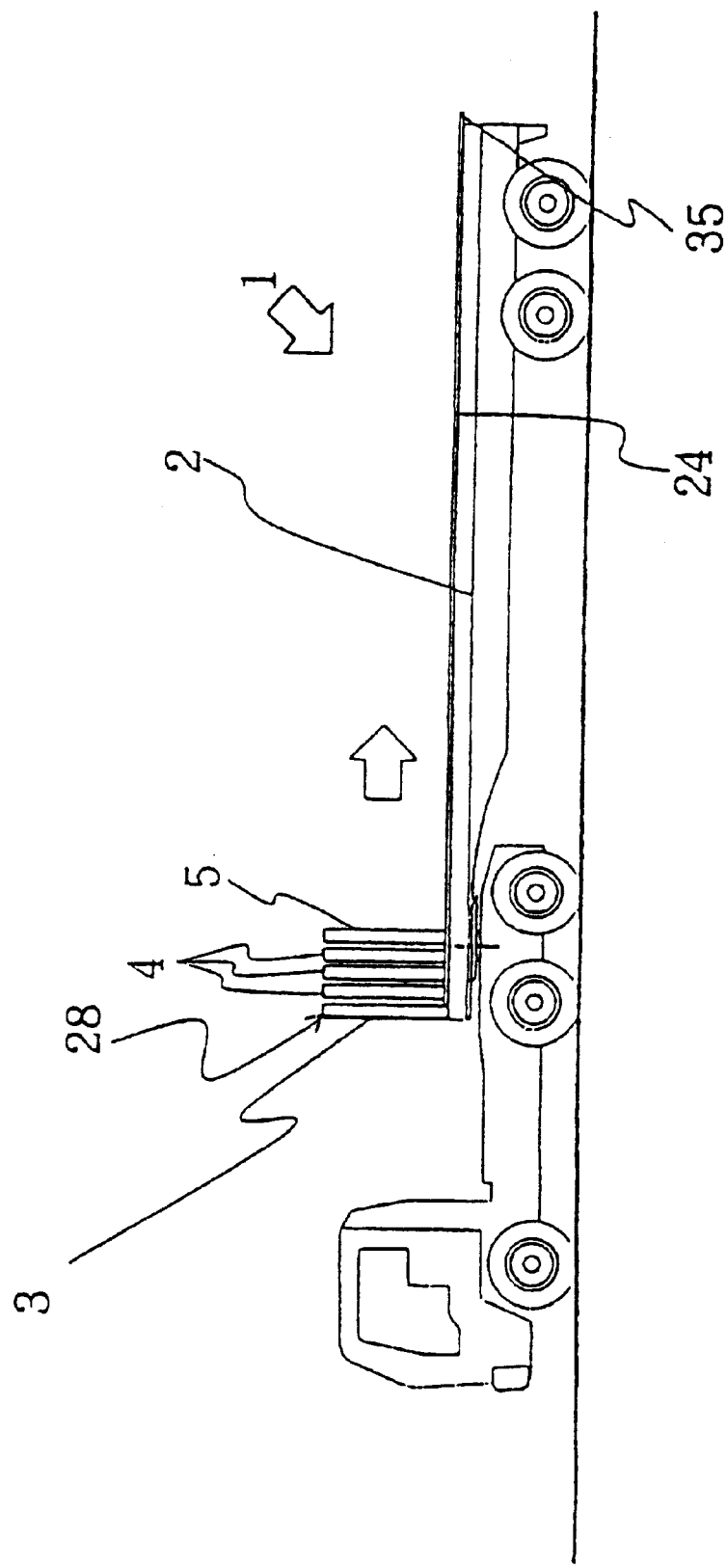
FIGS. 1 to 13 illustrate an example in which, on the truck of a truck-trailer, a flap unit is mounted as a cargo containing unit so that the flap unit can be freely moved along the longitudinal direction of the truck.
Figure 2:
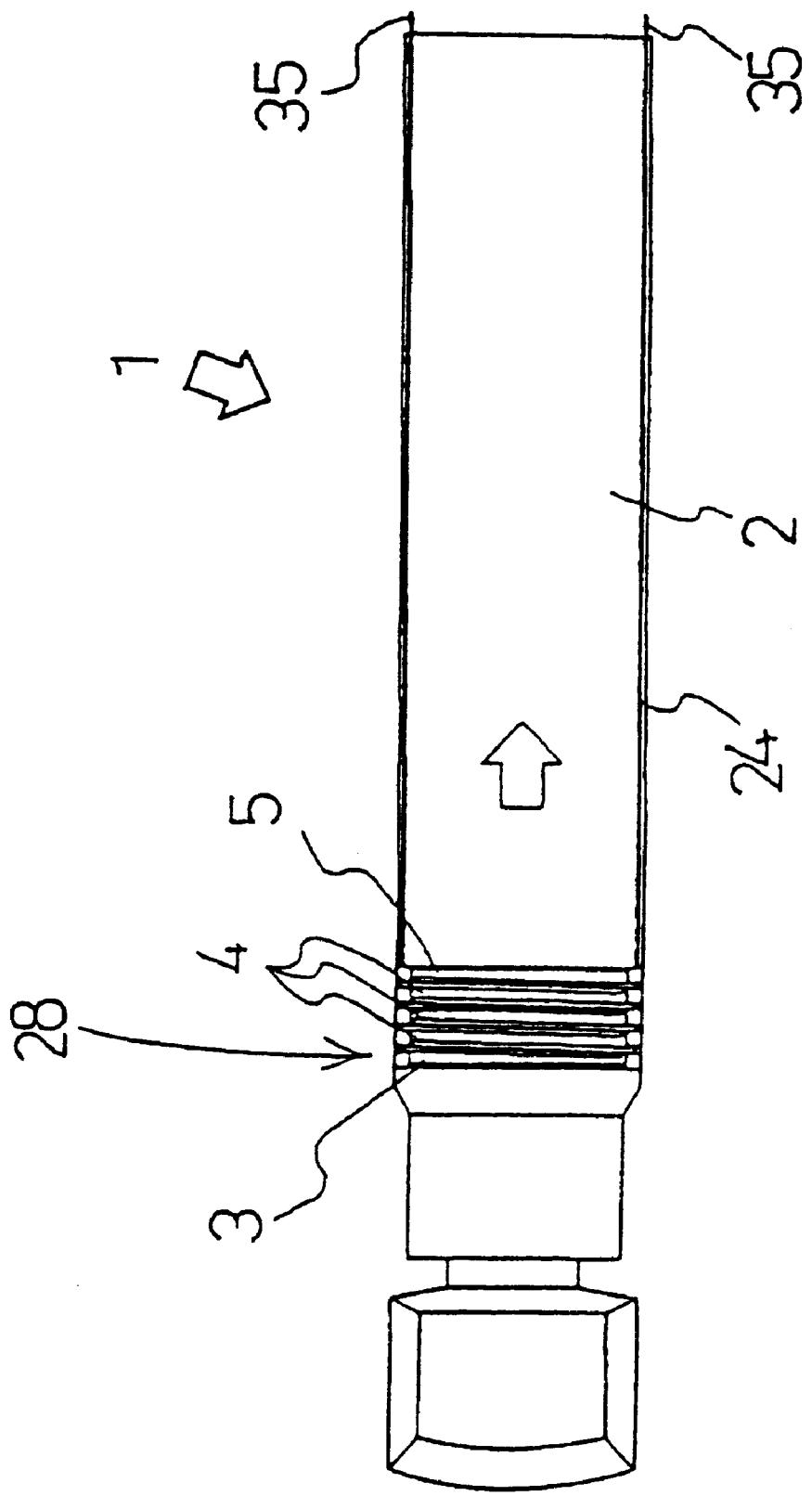
Figure 3:
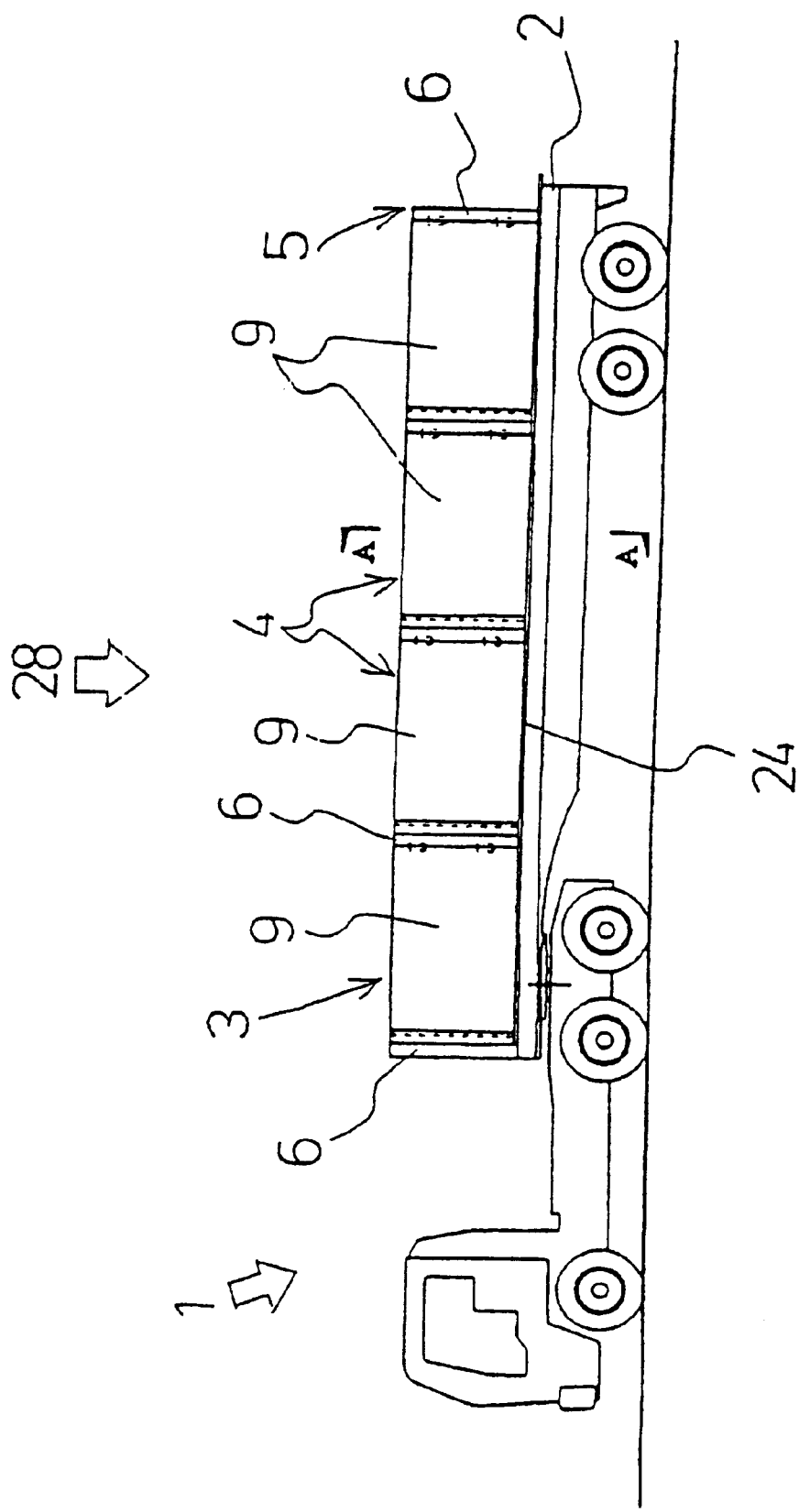
Figure 4:
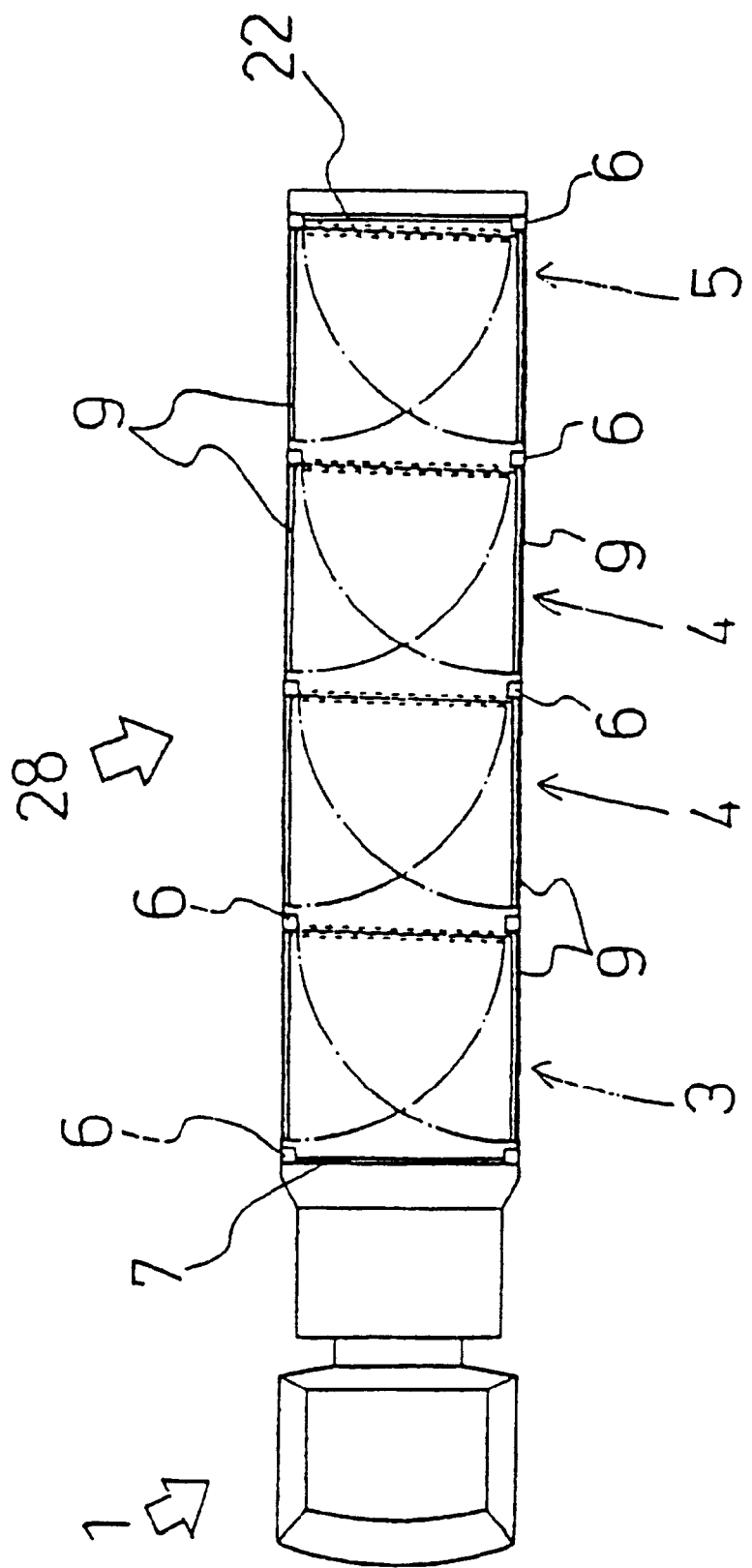
Figure 5:
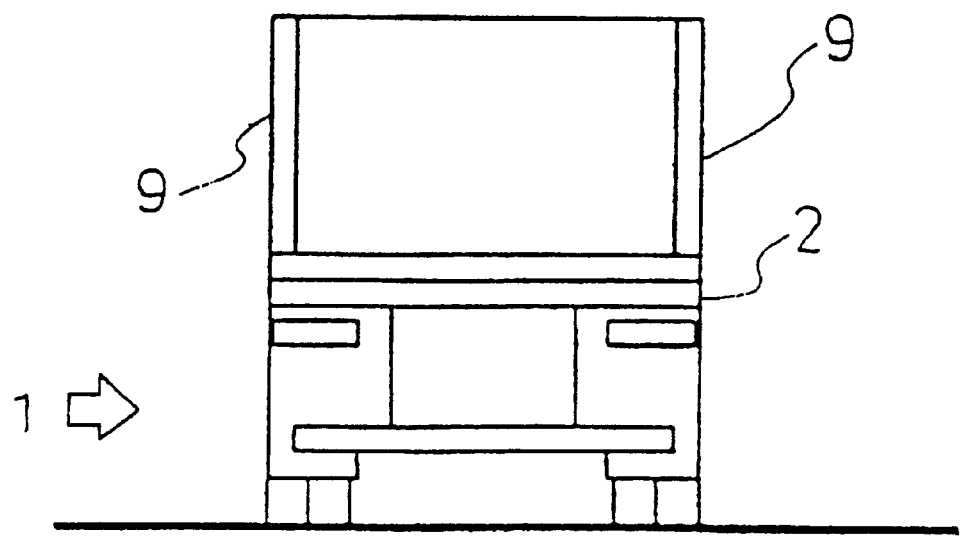
Figure 6:
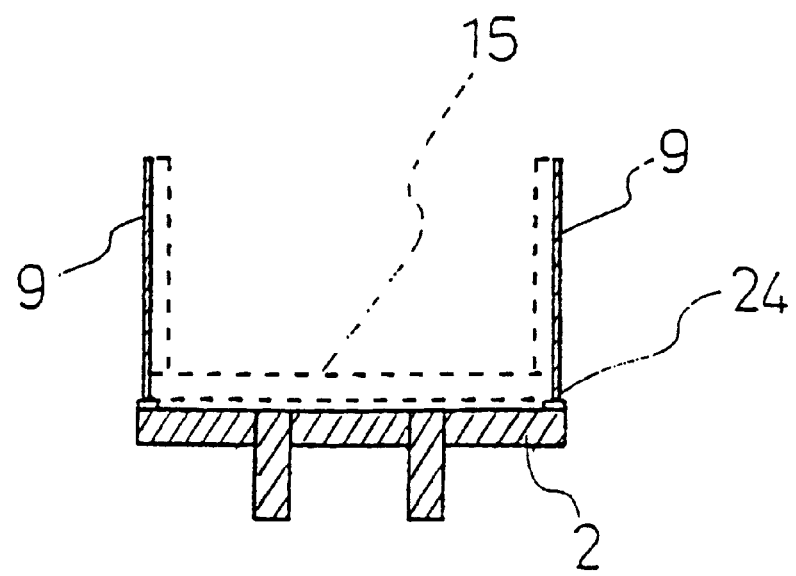
Figure 13:
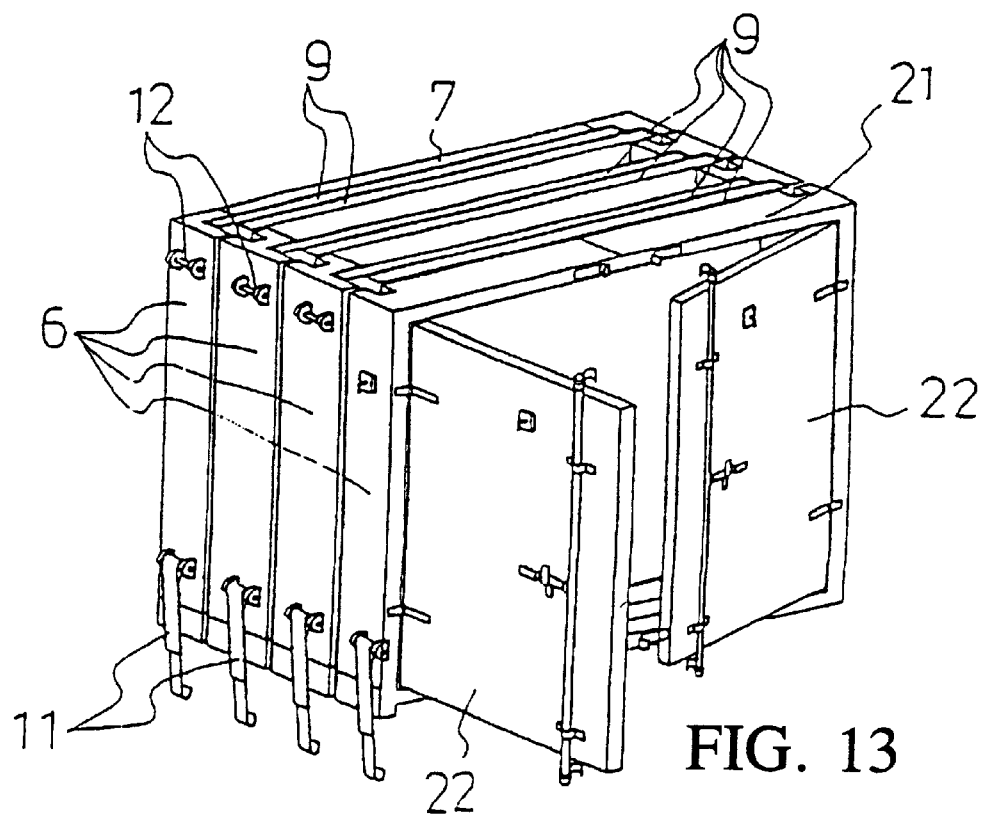
Figure 14:
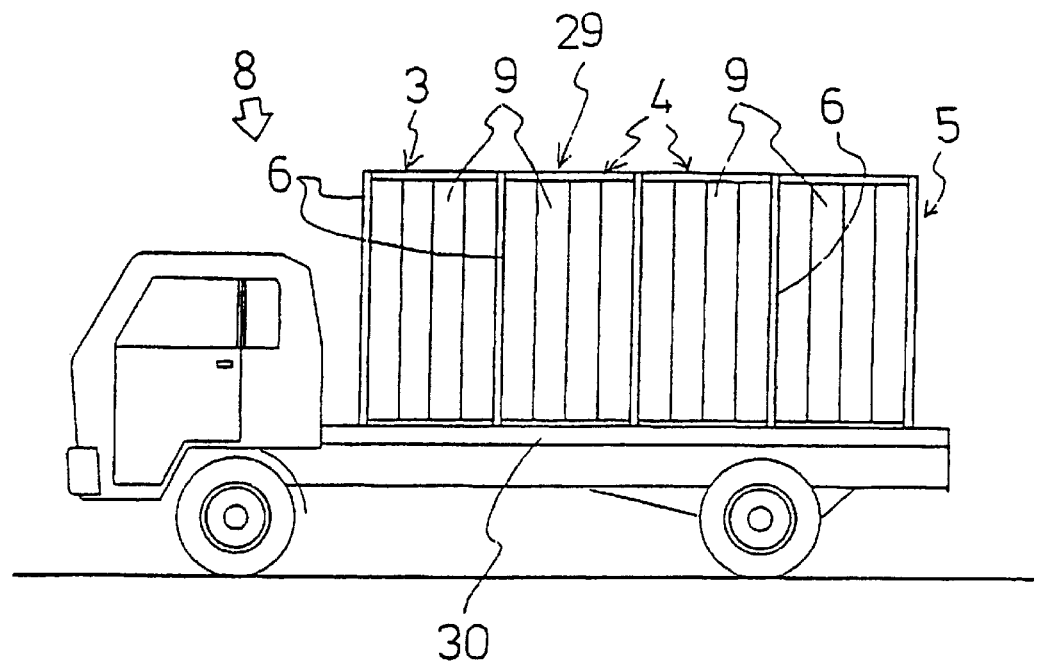
FIGS. 14 to 28 show an example in which a container unit is mounted as a cargo-containing unit on the rear deck of a motor-truck, so that the container unit can be freely moved along the longitudinal direction of the rear deck.
Figure 15:
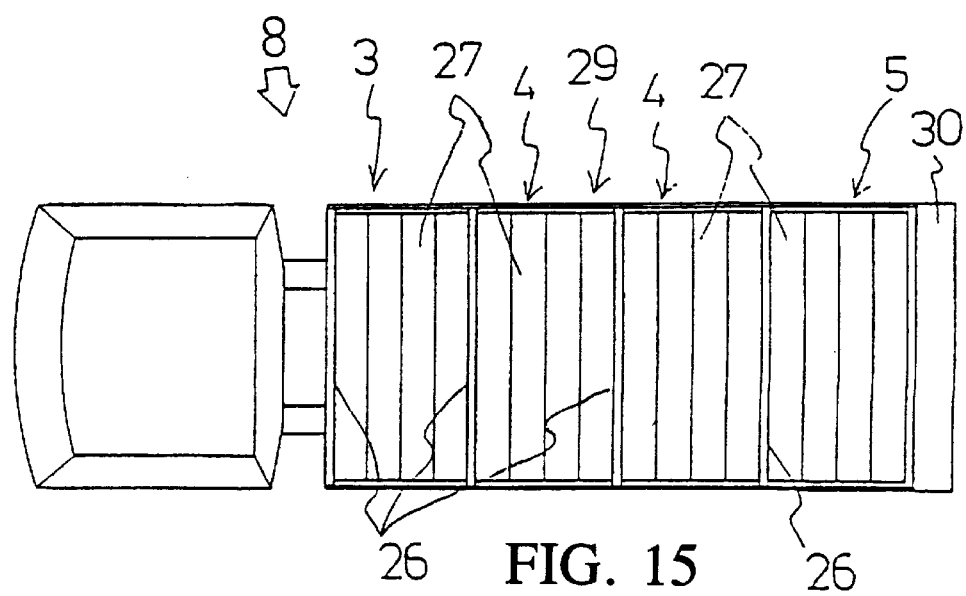
Figure 16:
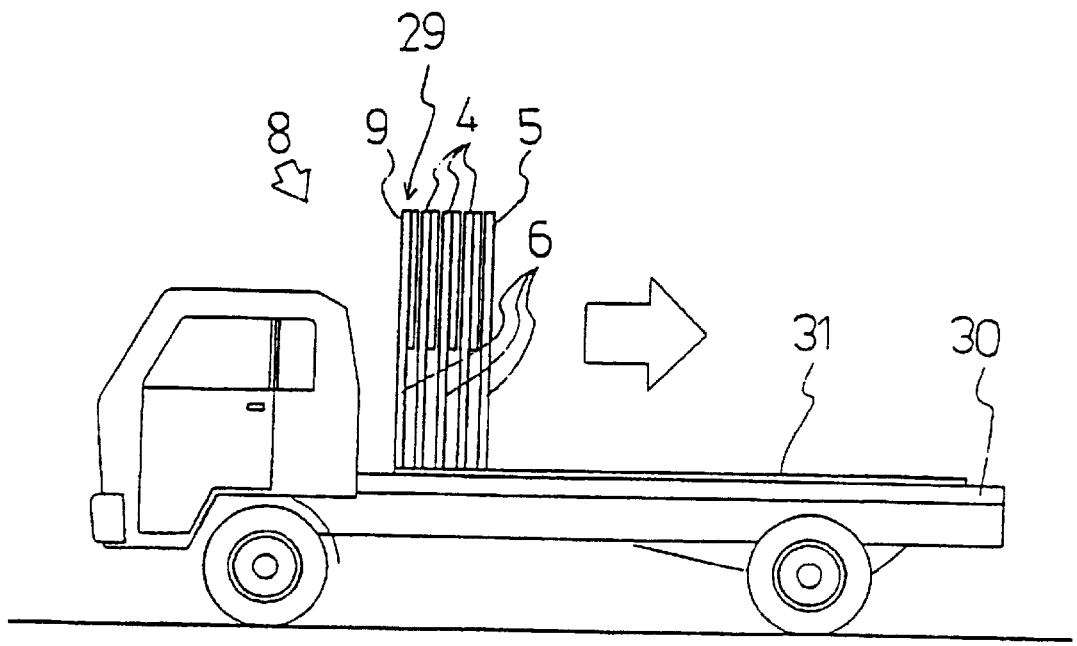
Figure 17:
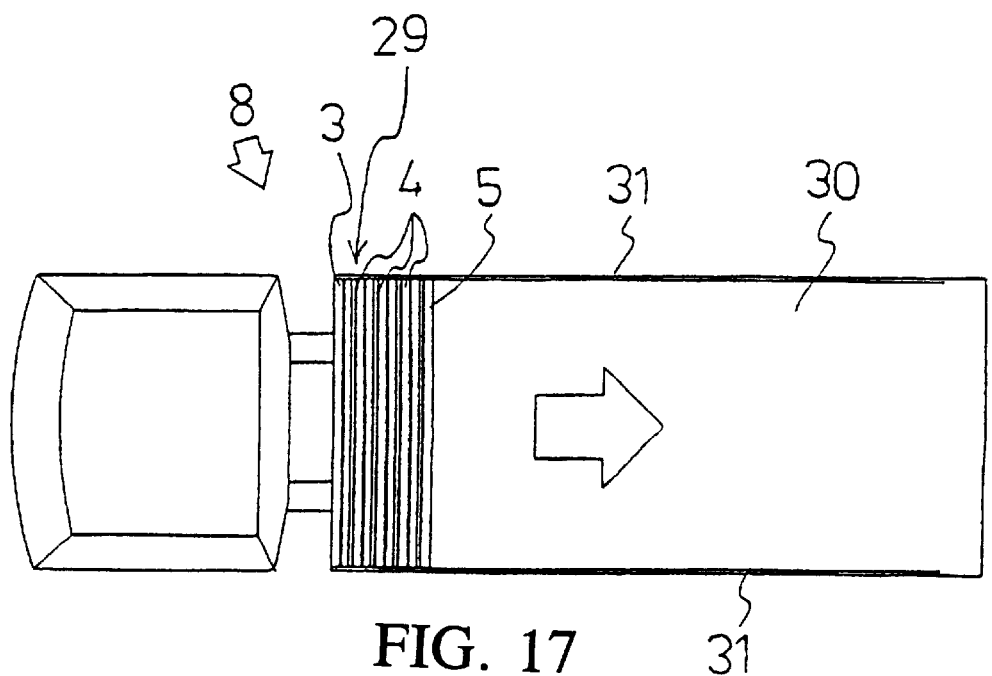
Figure 18:
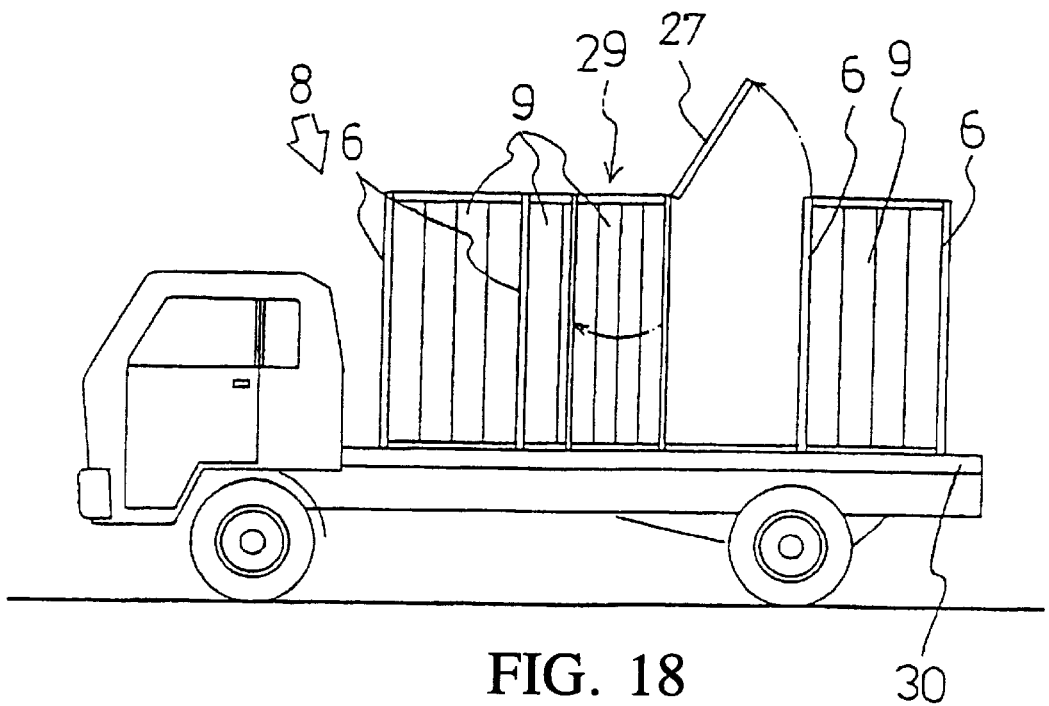
Figure 19:
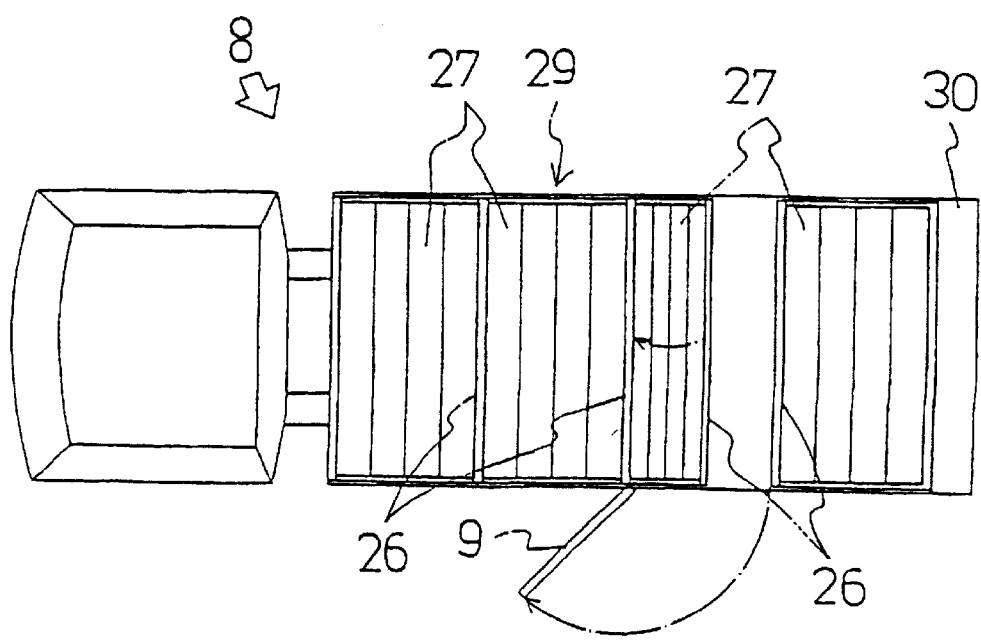

To use the truck-trailer 1 as a plain body vehicle, the units 3, 4, and 5 are folded perpendicularly and brought together to the front portion of the truck 2 as shown in FIGS. 1, 2, and 13. The top unit 3 is folded by swinging the side wall 9 around the pillar 6 by means of the hinges to put the side wall 9 upon the fixed wall 7 for positioning the side wall 9 in the crosswise direction of the truck 2. In this case, the two side walls 9 are put one upon the other, resulting in three layers being formed.

The intermediate unit 4 is folded in the same way by swinging the side wall 9 for positioning the side wall 9 in the crosswise direction of the truck 2, and the door 22 of the end unit 5 is shut by swinging the door 22 to be parallel with the crosswise direction of the truck 2. By these operations, the truck 2 is brought into the state in which the side and rear areas are open, and thus the truck 2 can be used as a plain body vehicle.

To use the truck-trailer 1 as a flap type vehicle, the intermediate units 4 and the end unit 5 are moved toward the rear of the truck 2, and the side walls 9 are opened to be parallel with the longitudinal direction of the truck 2 so that a flap unit is formed. The intermediate units 4 and the end unit 5 are moved toward the rear by sliding the pillar 6 horizontally through the wheel 10 and the rail 24. In this case, the end unit 5 is moved to the play 35 formed by protruding the rail 24 rearwardly so that the rear end of the end unit 5 protrudes from the truck 2.

Then, the pillar of the intermediate unit 4, which is positioned in front of the end unit 5, is moved in the same way toward the rear, the side wall 9 of the intermediate unit 4 is opened to be parallel with the longitudinal direction of the truck 2, and the end is fitted into the groove 18 formed in the pillar 6 of the end unit. Then, an adjacent intermediate unit 4 in front of the above-described intermediate unit 4 is moved in the same way toward the rear, and the side wall 9 is opened and fitted into the groove 18 formed in the pillar 6 of the intermediate unit 4 at the back of the intermediate unit 4. Thus, the side walls 9 of both the intermediate units 4 are connected to one another in sequence through the pillars 6.

Finally, the side wall 9 of the top unit 3 is opened, and the end is fitted into the groove 18 formed in the pillar 6 of the intermediate unit 4 at the back. In this case, the allowance for movement for fitting is secured because the intermediate units 4 at the back and the end unit 5 are moved toward the rear with the use of the play 35. By moving all the intermediate units 4 at the back and the end unit 5 toward the front, the side wall 9 of the top unit 3 can be fitted into the pillar 6 of the intermediate unit 4 at the back without obstacle.

In the above example, the end unit 5 at the rear and the intermediate units 4 are opened before being connected. The method of connection is not limited to this, but rather these units can be moved toward the rear once, being kept closed, and then moved toward the front one by one to be connected to one another by opening the side wall 9. The top unit 3 is provided with the fixed wall 7, the intermediate units 4 are provided with the connecting beam 15, and the end unit 5 is provided with the frame 21. Therefore, with these units, the opposed pillars 6 are moved simultaneously, resulting in ease of operation and stability in movement and storage being assured.

After the units 3, 4, and 5 thus are positioned in place, the operation lever 11a of the fixing fitting 11 is turned upwardly to be loosened and the end of the fixing lever 11b is engaged with the engaging pin 25. Then, the operation lever 11a is turned downwardly to be tightened so that the pillar 6 is fixed to the rail 24, and thus to the truck 2.

In this way, the side walls 9 form a flap unit on the truck 2 to provide a vehicle equipped with a flap unit.

EXAMPLE 2

Figure 20:
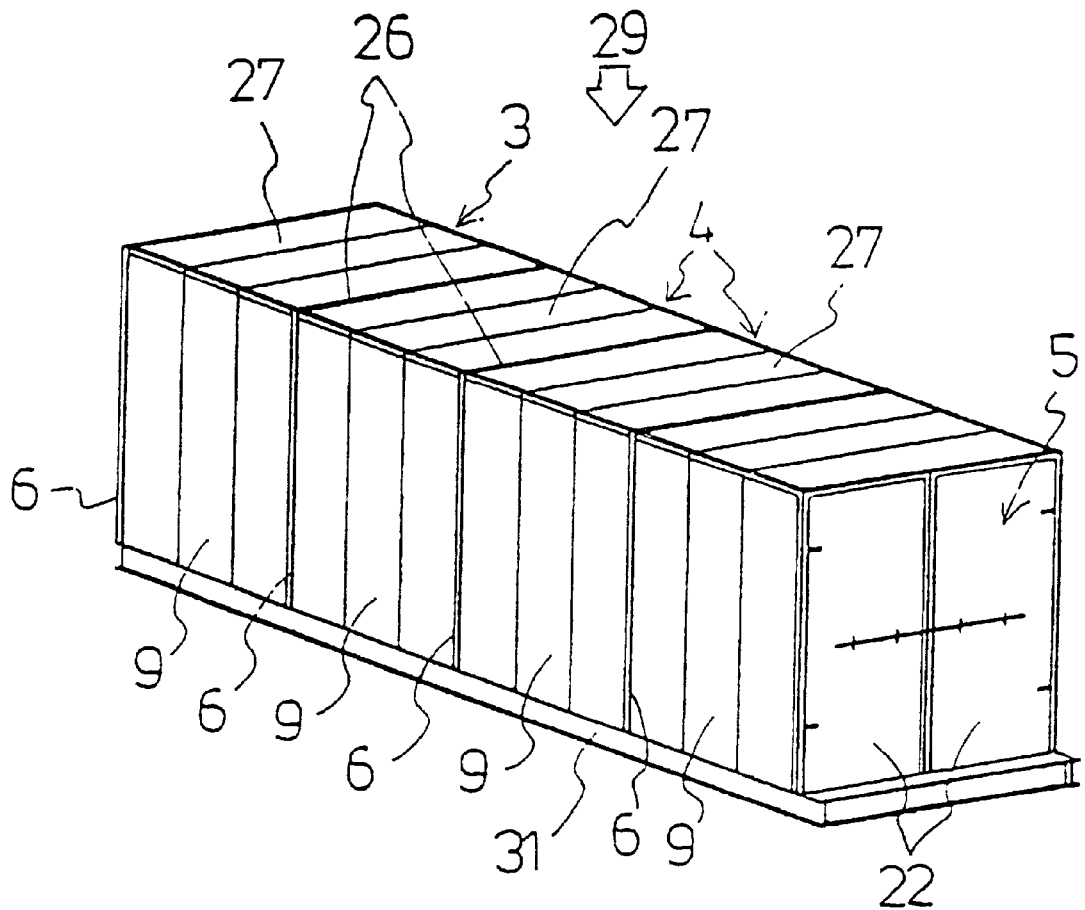

FIGS. 14 to 28 illustrate another example of the present invention. With respect to this example, a container unit 29, that can be freely folded, is mounted on the rear deck 30 of a motor-truck 8 as a cargo containing unit so that the container unit can be freely slid along the longitudinal direction of the rear deck 30. As with the flap unit 28, the container unit 29 includes a top unit 3, intermediate units 4, and an end unit 5, as shown in FIG. 20. A light metal such as aluminum is used as the material for the unit.

The configurations of the units 3, 4, and 5 are basically the same as those of the flap unit 28, and the bottom of a pillar 6 is engaged with a guide rail 31 made of a material such as I-steel so that the units can be freely slid in the horizontal direction. The side of a side wall 9 is mounted to the pillar 6 so that the wall 9 can be freely swung, and a door 22 is mounted to the pillar 6 of the end unit 5 so that the door 22 can be freely swung. The guide rail 31 may be provided on the rear deck 30 as with the flap unit 28, or as shown in the figure, the guide rail 31 can be provided as an integral part of the container unit 29.

Figure 21:
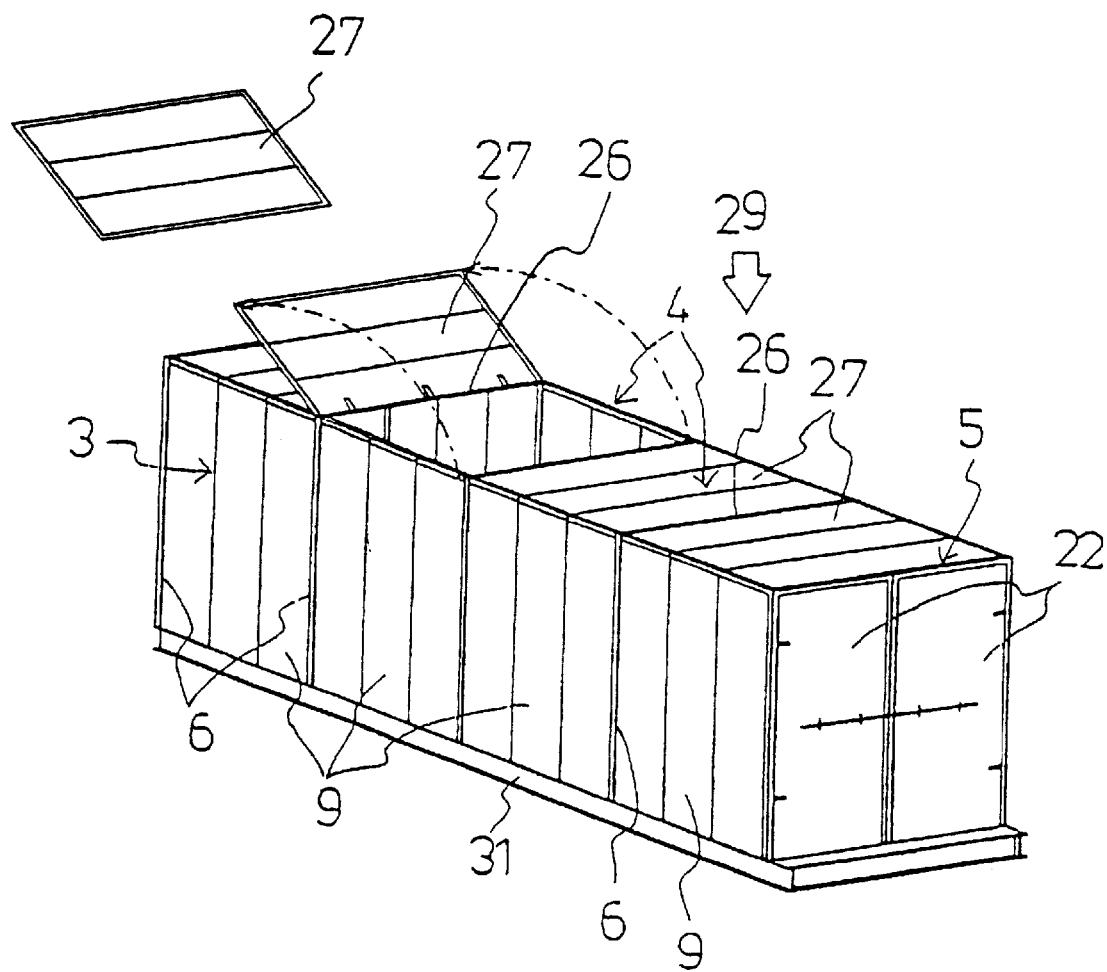

In addition to these configurations, a beam member 26 is mounted across the upper ends of the pillars 6 of the top unit 3 and the intermediate units 4, and one end of a roof 27 is mounted to the beam member 26 with hinges so that the roof 27 can be swung. The roof 27 is made of a light metal such as aluminum similar to the side wall 9. The configuration may be of a one piece type as shown in the figure, or of a type which connects two pieces with hinges so that the pieces can be folded. The roof 27 can be mounted on the beam member 26 so that not only the roof 27 can be swung, but also the roof 27 can be fully removed as shown in FIG. 21.

Figure 22:
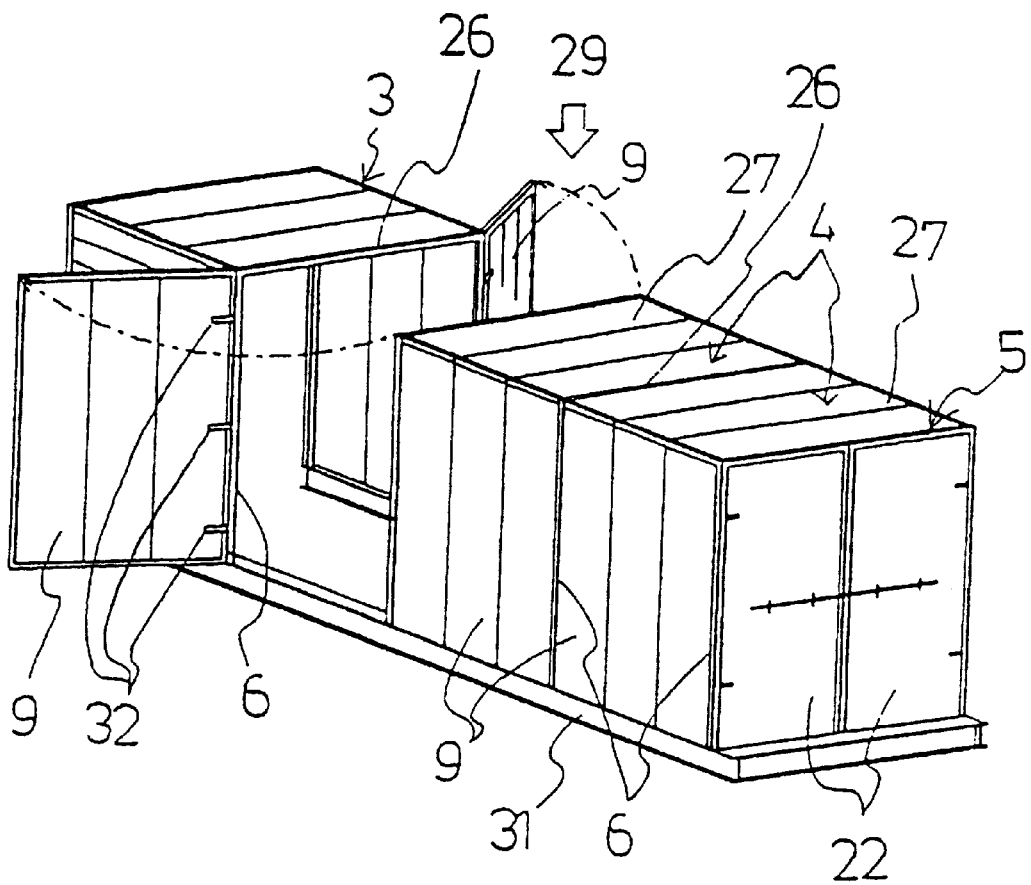
Figure 23:
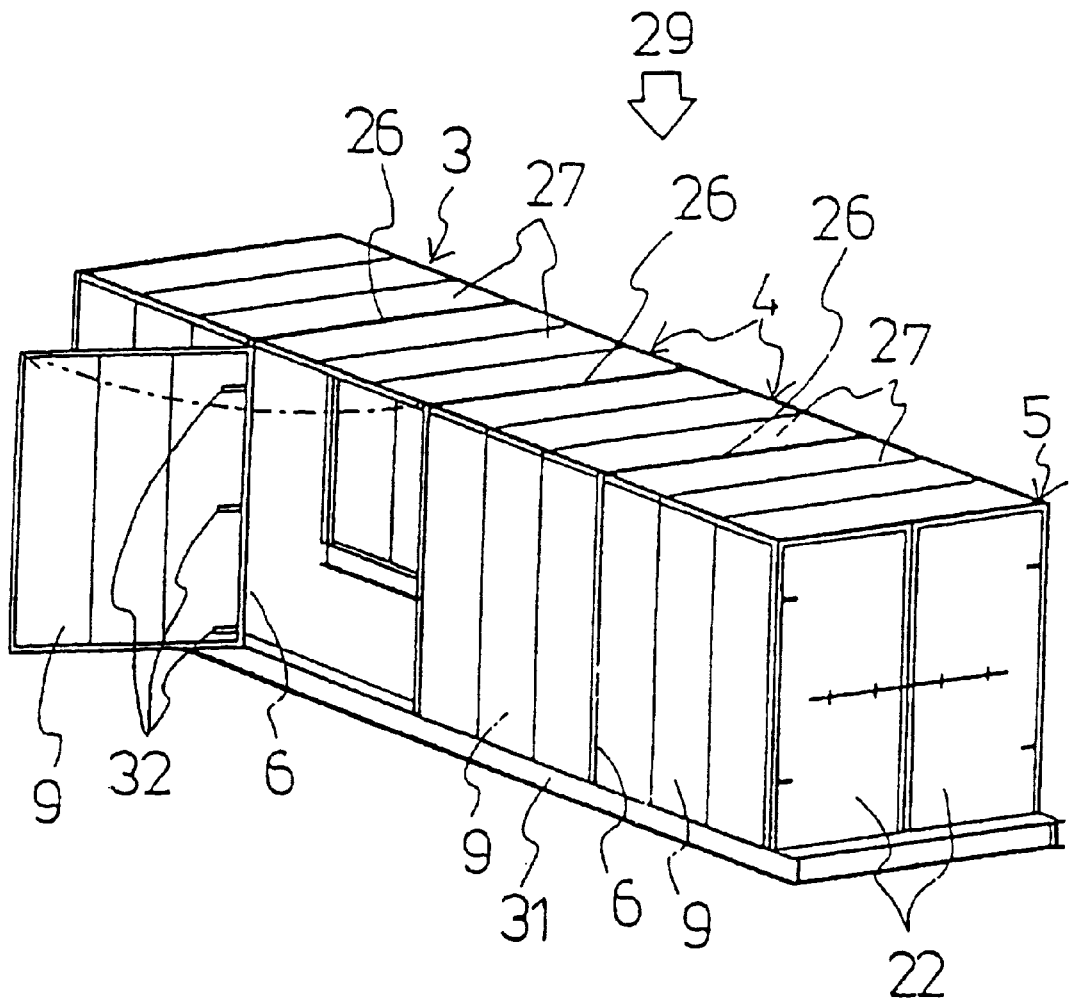
Figure 24:
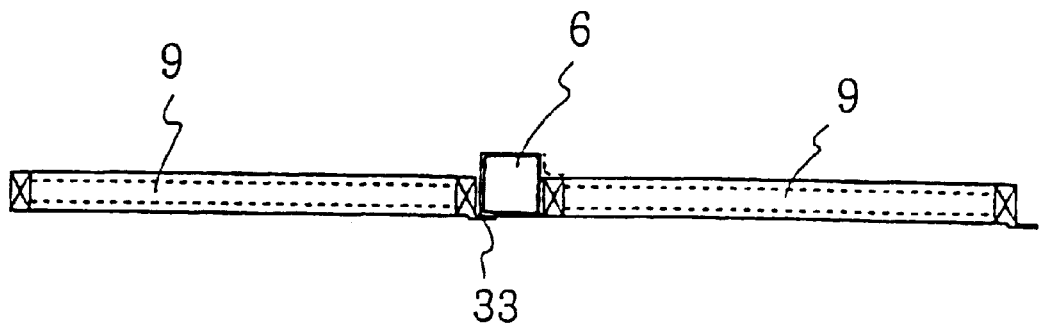
Figure 25:
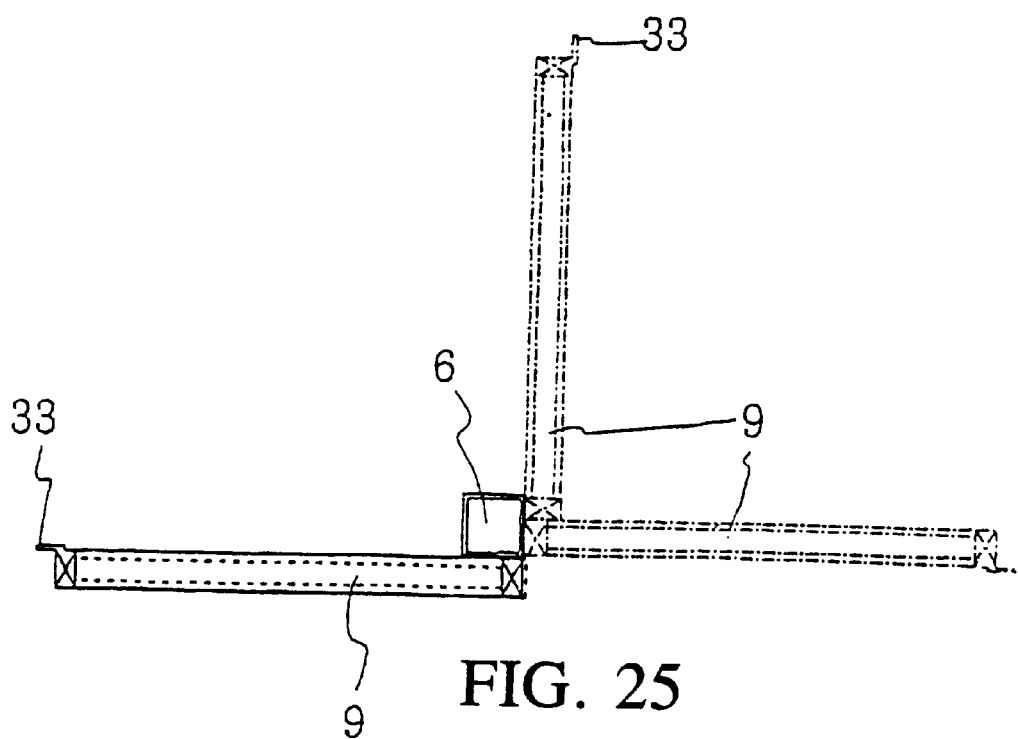
Figure 26:
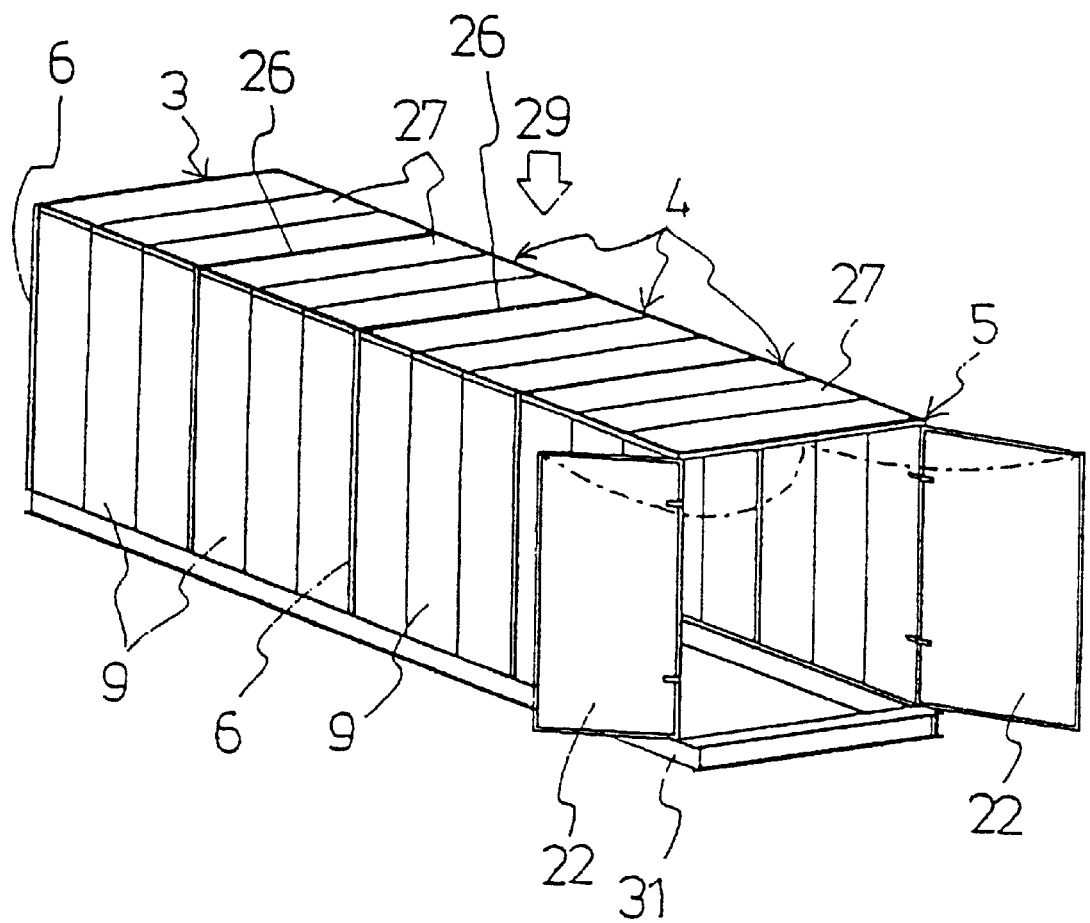
Figure 27:
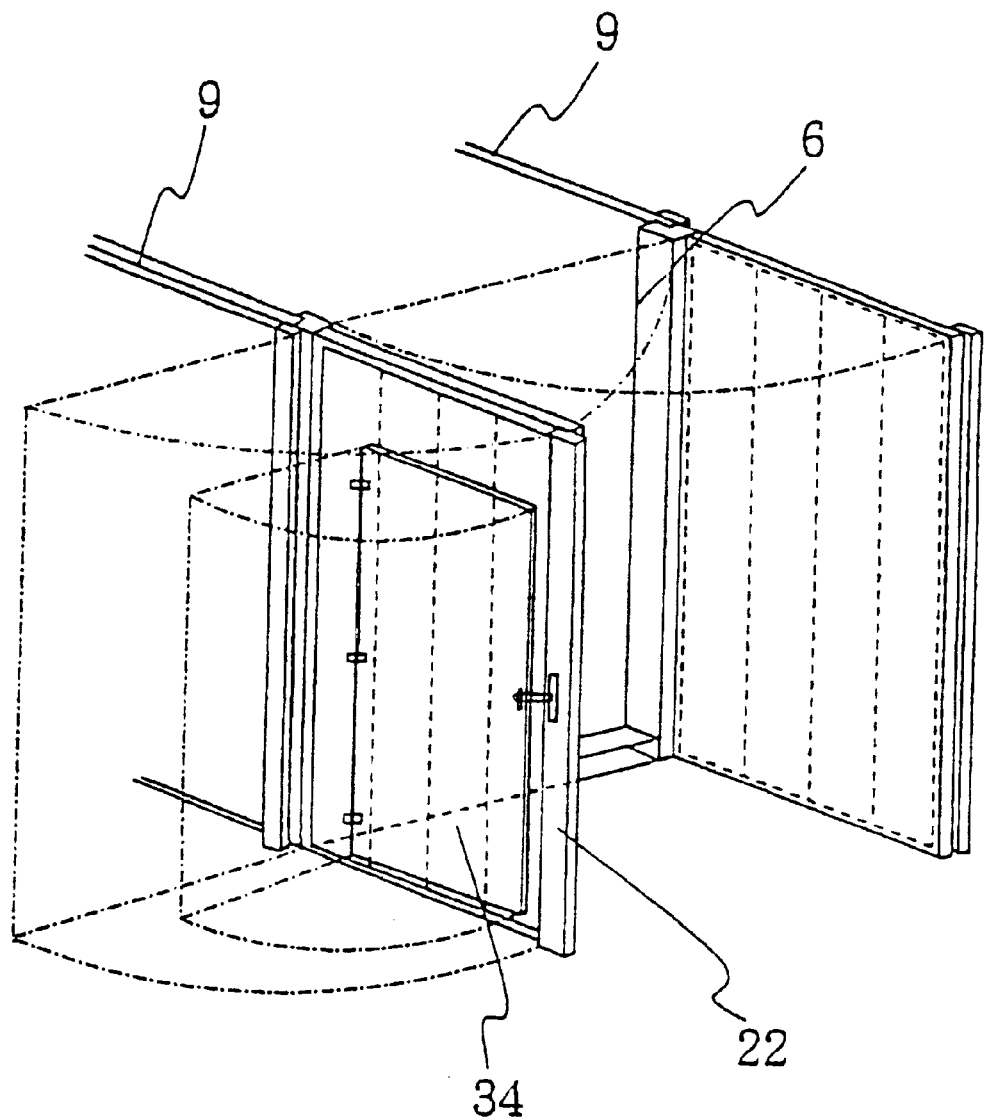

As shown in FIGS. 22 and 23, when the side wall 9 is configured so that it can be opened and closed with hinges 32 in the assembled state, the side wall 9 can also function as a door. In this case, the opening angle is set at an arbitrary value, such as 180 degrees or 270 degrees, from the storage position where the side wall 9 is folded inwardly, as shown in FIGS. 24 and 25. When the side wall 9 is configured so that it can be opened and closed in the assembled state, a protruded portion 33 is provided at the side end so that it can be brought into tight contact with the adjacent pillar 6 as a flashing. When the protruded portion 33 is in the above-described location, the side wall 9 is fixed to the adjacent pillar 6 with a fastener. Besides this door, i.e., the side wall 9 that can be opened and closed freely, and the door 22 at the rear, another door 34 may be provided in the frame of the door 22 at the rear as shown in FIG. 27.

Figure 28:
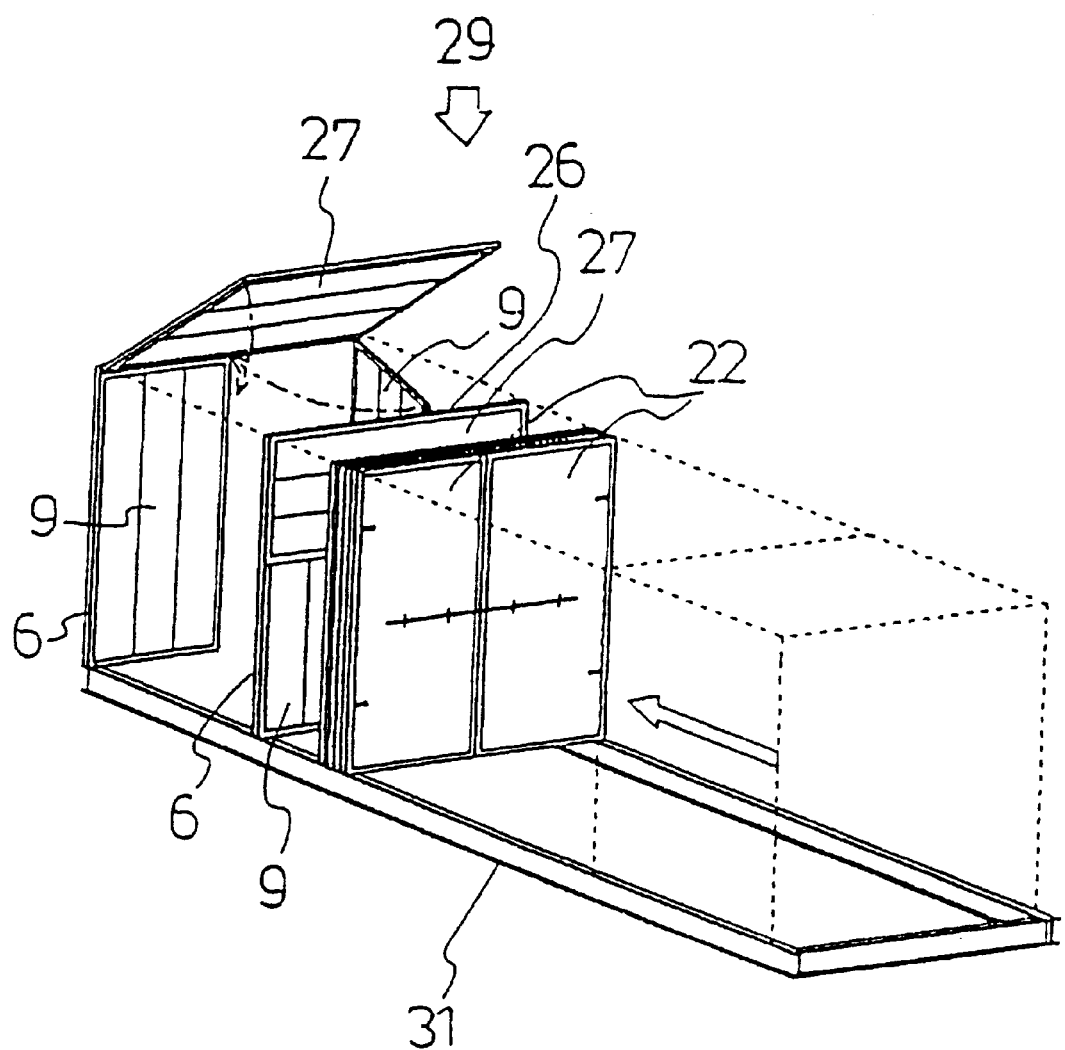

Next, how to use it will be described. For example, when the motor-truck 8 is used as a plain body vehicle on the outward trip, and as a container type vehicle on the return trip, the container unit 29 is loaded on the rear deck 30. To use the motor-truck 8 as a plain body vehicle, the units 3, 4, and 5 are folded perpendicularly and brought together to the front portion of the rear deck 30 as shown in FIG. 28. The top unit 3 is folded by swinging the side wall 9 inwardly around the pillar 6 by means of the hinges. The roof 27 is folded by swinging it downwardly around the beam member 26 with the hinges to put the roof 27 on the side wall 9 for positioning the roof 27 in the crosswise direction of the rear deck 30.

The intermediate unit 4 is folded in the same way by swinging both the side wall 9 and the roof 27 for positioning them in the crosswise direction of the rear deck 30.

The door 22 of the end unit 5 is shut by swinging it to be along the crosswise direction of the rear deck 30. By these operations, the rear deck 30 is brought into the state in which the side and rear areas are open, and thus the rear deck 30 can be used as a plain body vehicle.

To use the motor-truck 8 as a container vehicle from this state, the same procedure as that for assembling a flap type vehicle is performed. The pillar 6 is moved toward the rear along the guide rail 31, and the side wall 9 is swung to be parallel with the longitudinal direction of the rear deck 30 for assembling the side portion. Then, the roof 27 is raised to the horizontal position by swinging it around the beam member 26 to cover the top opening between the right and left side walls 9.

By following the above-described procedure, the plain body vehicle can be changed into the form of a container vehicle. In use, not only the door 22 at the rear, but also the side wall 9 and the roof 27 can be opened and closed at any place, and thus the necessity for sorting and moving of cargoes inside the motor-truck 8 can be minimized. In addition, cargoes can be loaded and unloaded from any of the top, front, intermediate sections, and from the rear of the container. If the roof 27 is opened or removed as shown in FIG. 21, an overhead crane can be used to load and unload cargoes. Further, if all the roofs 27 are removed, the container vehicle can be changed into a flap type vehicle.

Unit movement on the rear deck 30 of the truck 2 may be done by hand, or it can automatically be done by remote control. It is desirable that the units having two different heights be made available to suit different heights of cargoes.

EXAMPLE 3

FIGS. 29 to 37 illustrate another example of the present invention. With respect to this example, a container unit 29 to be loaded on the rear deck 30 of a motor-truck 8 includes shutters 47.

Figure 32:
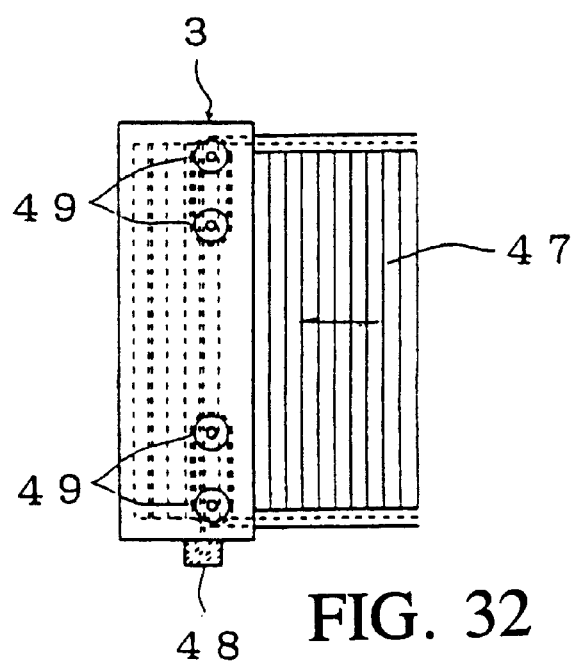
Figure 33:
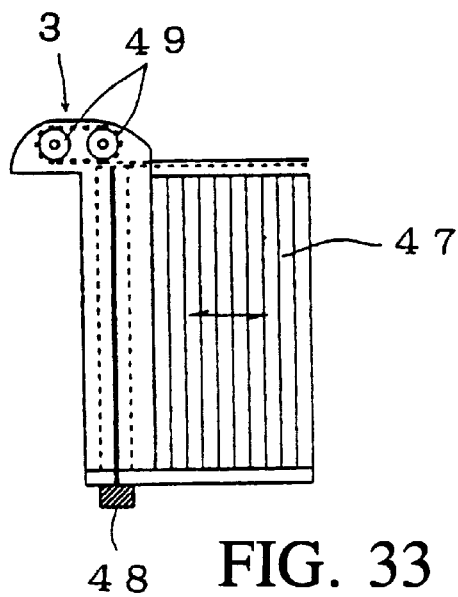

With respect to this example, adjacent units are connected to each other with folding frames 46 (see FIGS. 34 to 37), and the folding frames 46 are provided with a groove (not shown) for use as a guide for the shutter, respectively. The frames 46 can be provided on both a side and a top as shown in FIG. 34, and may be provided only on either of the side and the top. With respect to this container unit, each of the walls is made up of a shutter 47, and as shown in FIGS. 32 and 33, in the top section and both side sections of the top unit 3, the shutters 47 are accommodated to form the ceiling and both side walls of the container unit 29, respectively. The shutters 47 can be wound up onto and unwound from the rolls 49 by the motors 48.

With respect to this example, two intermediate units 4 and an end unit 5, which are provided by connecting two pillars with a beam across the tops, are connected with the folding frames 46 to form a container unit. In the bottom portion of the pillars of each unit, a rotating member (not shown), such as a wheel and a roller, is provided so as to be engaged with a rail (not shown) provided at both side ends of the rear deck of the motor-truck, thus the container unit is loaded so that it can be moved.

There is no particular limitation for the materials of the pillars, beams, connecting frames, shutters, and other components composing the container unit. Normally, the pillars and beams are made of a metal having a high strength such as iron and steel, and the connecting frames 46 and shutters 47 are made of a light metal such as aluminum, or of a reinforced plastic. The number of intermediate units 4 can be increased or decreased depending upon the size of the rear deck.

With respect to this example, the rear wall 51 of the container unit 29 is formed by extending the shutter 47 constituting the ceiling, and other configurations are possible, such as a configuration wherein a single swing door or french doors are loaded over the entire surface of the end unit 5 to form the rear wall with a door or doors.

Figure 29:
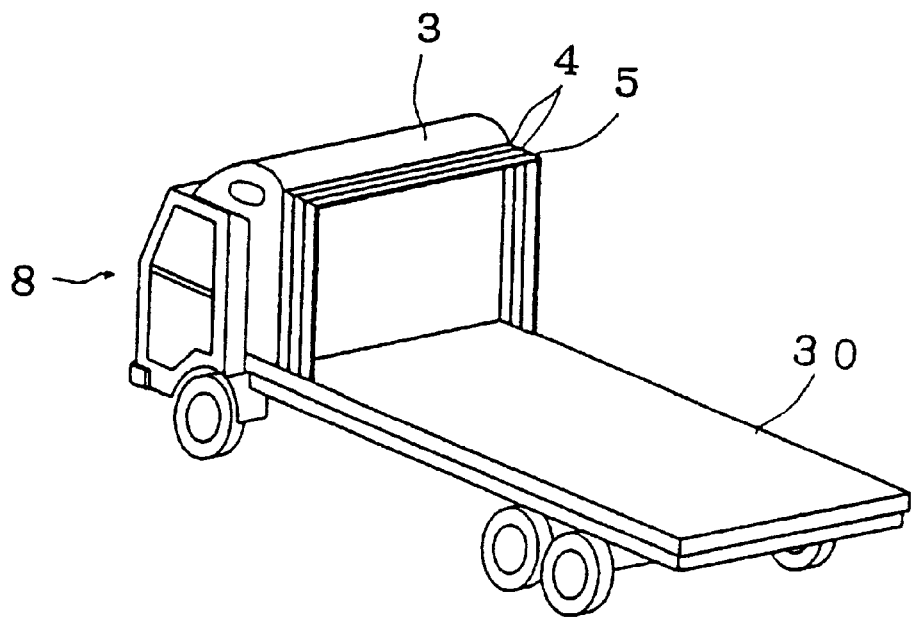
FIGS. 29 to 37 illustrate a container unit composed of shutters that is to be loaded on the rear deck of a motor-truck.
Figure 30:
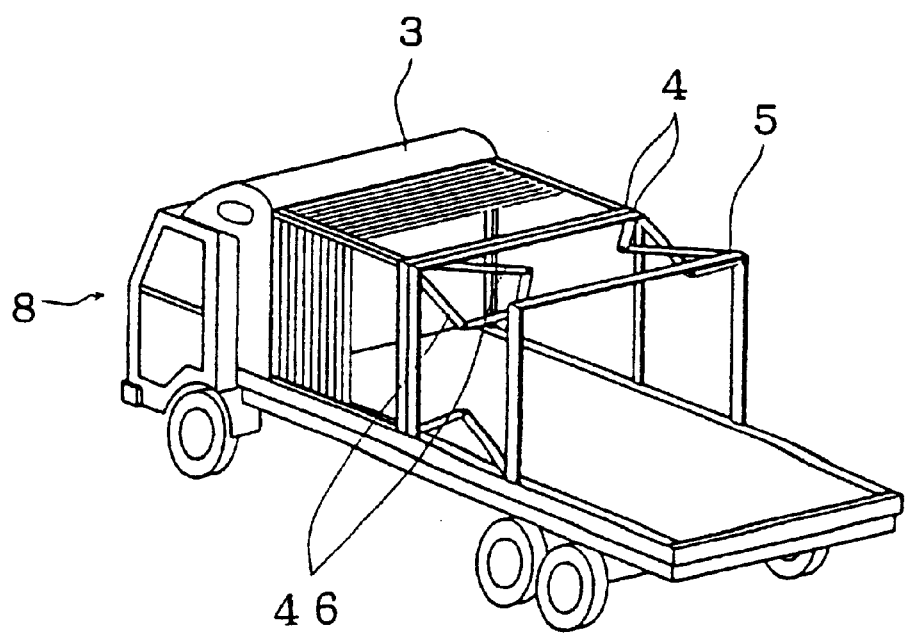
Figure 31:
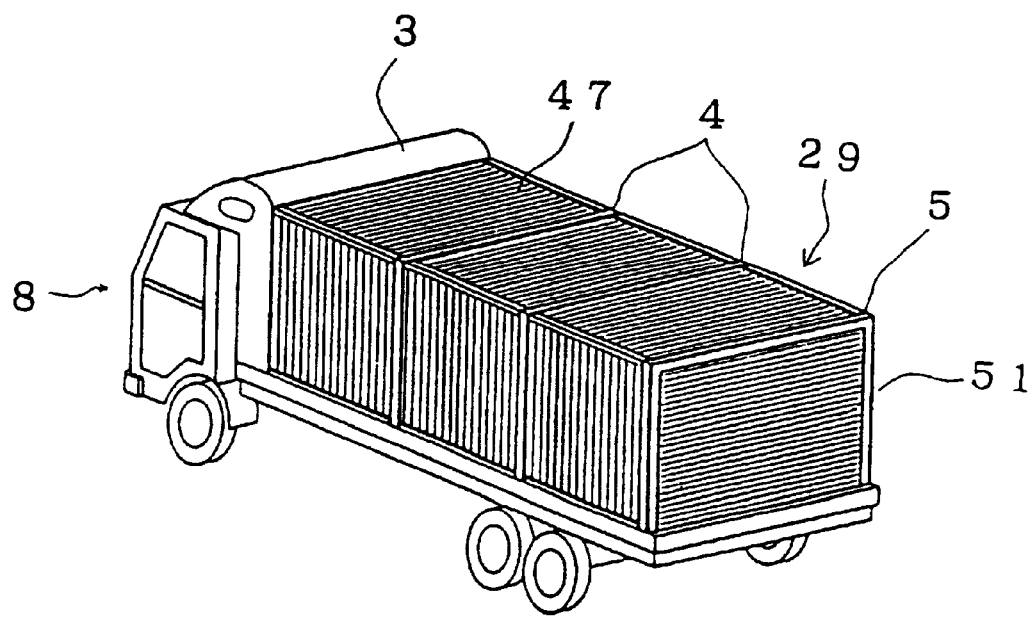

As shown in FIG. 29, the motor-truck provides a plain body vehicle when the intermediate units 4 and the end unit 5 are folded and brought together to the front portion of the rear deck. When the intermediate units 4 and the end unit 5 are moved into position, and the shutters are extended to assemble a container unit 29, the motor-truck can be used as a container type vehicle. The units can be moved by hand, and as required, they can be configured so that they can be driven with a motor or other device.

EXAMPLE 4

FIGS. 38 to 49 give another example of the present invention. With this example, a container unit 29 is loaded on the rear deck 30 of a motor-truck 8, and a flap unit is loaded inside the container unit 29 to provide a double structure of cargo containing section.

With respect to this example, the ceiling of the container unit 29 of the motor-truck includes a shutter 47, and each of both side walls includes side walls 9 made of a board and attached to the pillar of a unit so that the side wall 9 can be freely swung. On the top of the top unit 3 and the tops of the intermediate units 4, a shutter case 56 is provided (see FIG. 43) to accommodate a shutter 47 constituting the ceiling.

Flap intermediate units 54 and a flap end unit 55 are loaded inside of the container unit 29 so that they can be moved on the rear deck, thus, the cargo containing section is configured so as to be double-structured.

Figure 41:
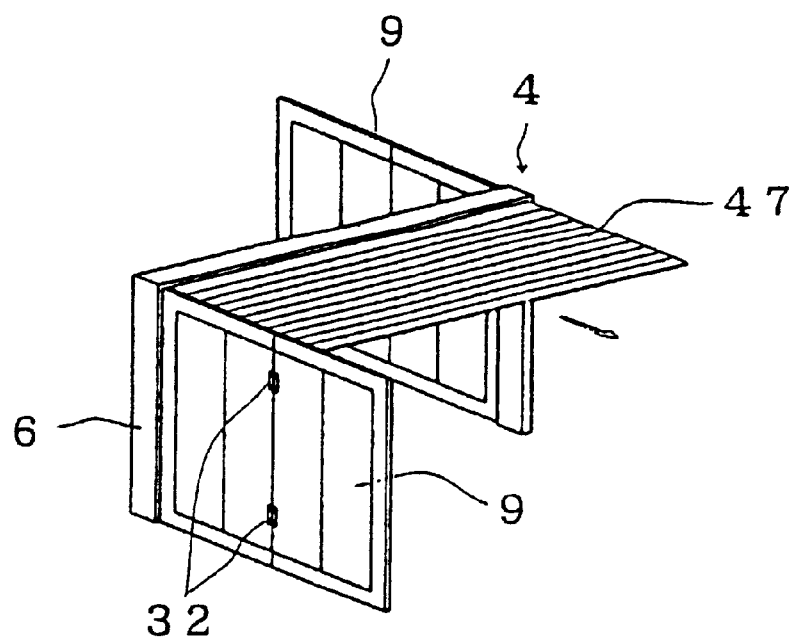
Figure 42:
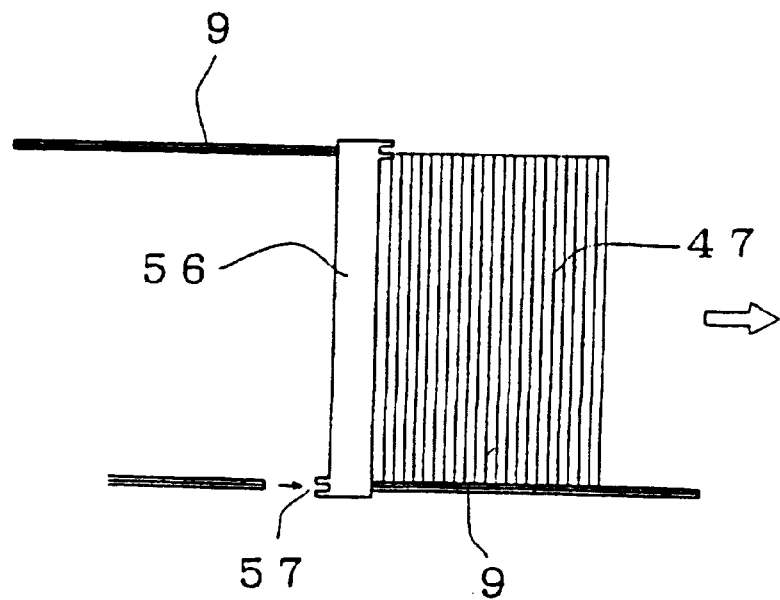
Figure 43:
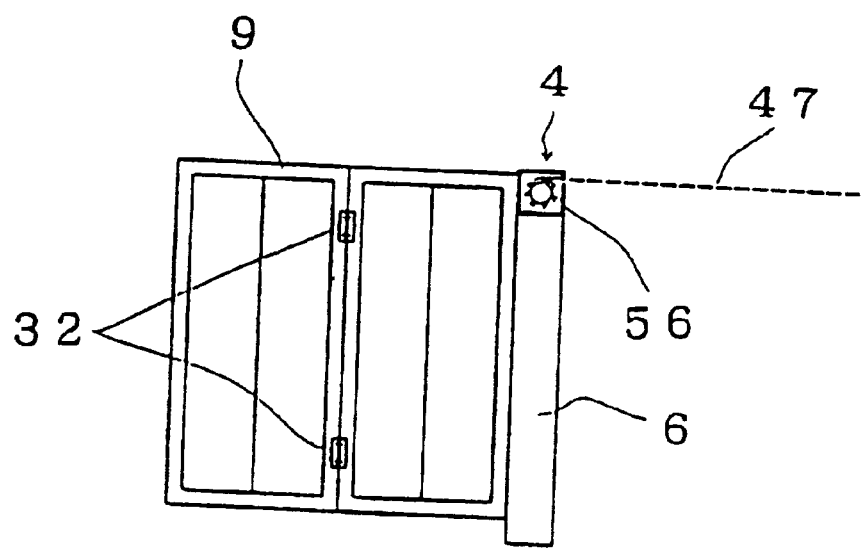
Figure 44:
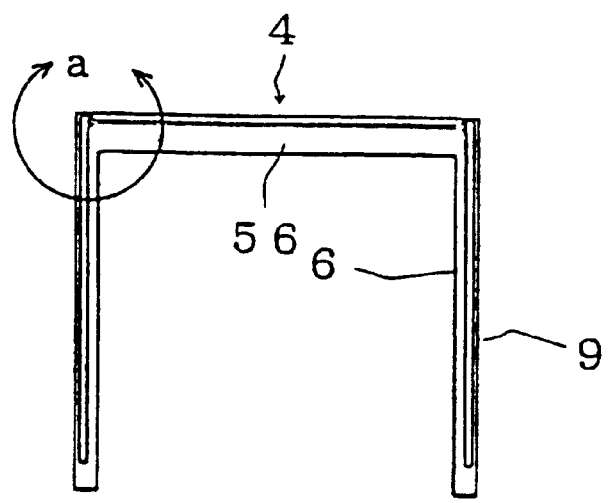
Figure 45:
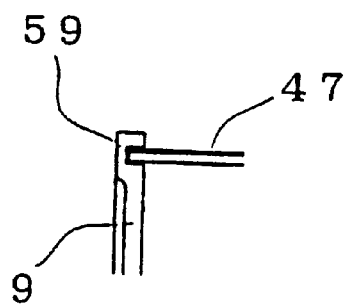
Figure 46:
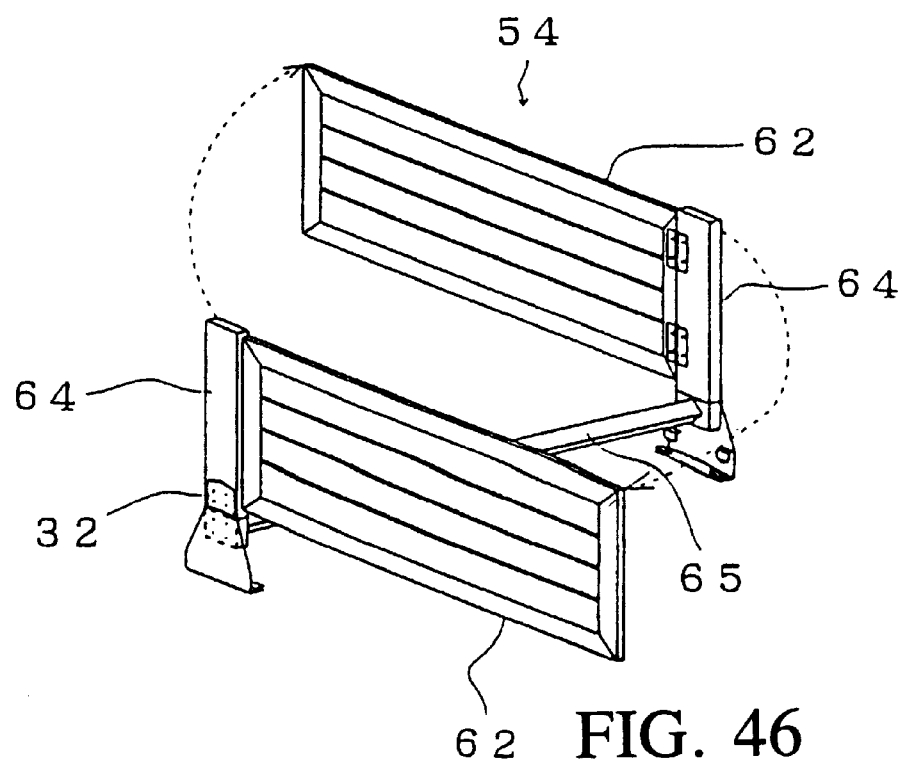

A board-like side wall 9 is attached to the pillar 6 of any one of the top unit 3 and the intermediate units 4 so that the side wall 9 can be freely swung. With respect to this example, as shown in FIGS. 41 to 43, a first side end of a side wall 9 is attached to the pillar 6 of an intermediate unit 4 so that the side wall 9 can be freely swung, and a second end is engaged with a groove 57 provided in the pillar 6 of the adjacent intermediate unit 4. The side wall 9 consists of two boards connected to each other with hinges 32, and can be folded, also, the side wall 9 can be composed of a single board. The width of the board can be appropriately set to suit the size of the rear deck. If the width of the board is set at practically the same value as the width of the rear deck, the board can easily and conveniently be engaged with the pillar when the units are folded.

On the top of the top unit 3 and the tops of the intermediate units 4, a shutter case 56 (see FIG. 43) to accommodate the shutter 47 is installed so that the shutter 47 can be wound up onto the roll by the motor. At the upper end of a side wall 9, a guide member 59 (see FIG. 45), such as a grooved one, is provided so that the shutter 47 can be guided. At both side ends of a shutter 47, a guide member, such as a grooved one, that is engaged with the top end portion of the side wall may be provided so that the shutter 47 can be guided.

With respect to the end unit 5, french doors 22, forming the rear wall of the container, are attached to the pillars so that the french doors 22 can be freely swung. The french doors 22 may be replaced with a single swing door, and the rear wall may be made up of a board, wherein a portion of the board is a door.

With respect to this example, a flap unit that can be moved on the rear deck is loaded inside of the container unit 29 so that the cargo containing section is configured to be double-structured. To provide such a double-structure, a guide member, such as a rail, is doubly installed at both side ends of the rear deck 30 of the motor-truck 8, and with the outside guide, the intermediate units 4 and the end unit 5 constituting the container unit 29 are engaged by means of such parts as wheels, rollers, and gears so that they can be moved. With respect to the inside guide, the flap unit is engaged so that the flap unit can be moved (See FIGS. 48 and 49).

The flap unit includes intermediate units 54 and an end unit 55 similar to a movable unit of the container unit 29. With an intermediate unit 54, the bottom portions of the two pillars 64, located at both side ends of the rear deck are connected to each other with a beam 65. A first side end of a board 62 constituting a side wall of the flap unit is attached to the pillar, in the same way as is that of the intermediate unit 4 of the above-described container unit 29 so that it can be freely swung (FIG. 46), and a second side end is configured so that the side wall 9 can be engaged with the adjacent unit. The side wall of the flap unit requires a certain degree of strength, thus, it is desirable that the board 62 be made up of a single board.

Figure 47:
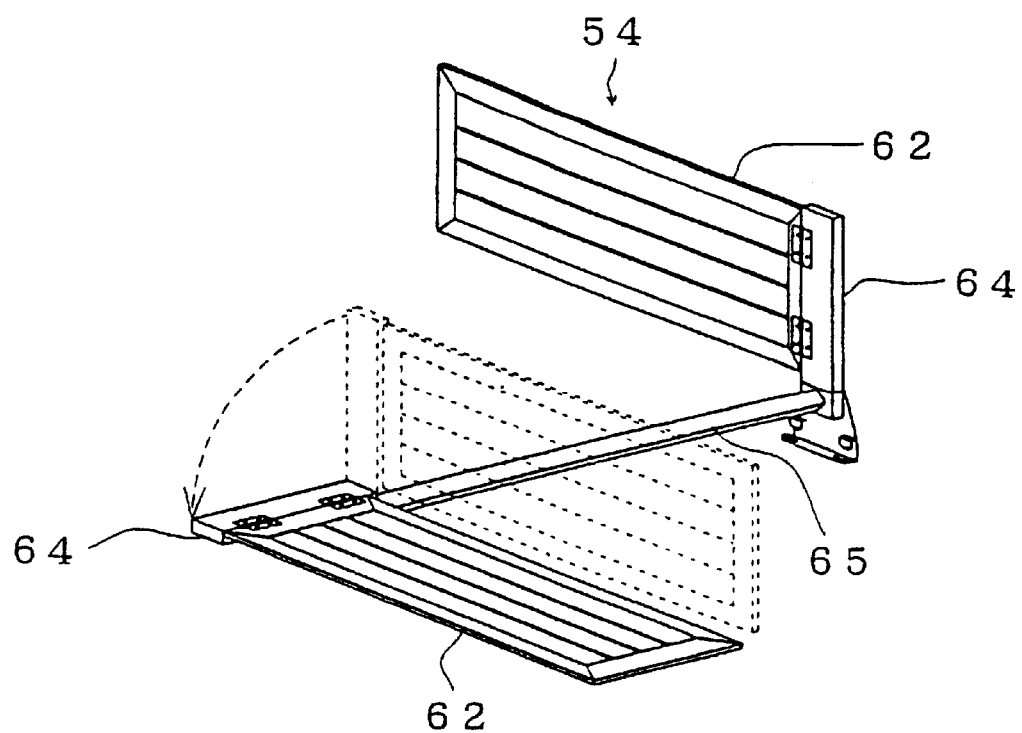

By providing such a part as a hinge for the bottom portion of a pillar 64, the flap unit side wall can be freely swung toward the outside of the rear deck after assembling the inside flap unit, as shown in FIG. 47, resulting in ease of loading and unloading of cargoes.

With respect to the end unit 55, the bottom portions of the two pillars are connected to each other with a beam as is done with the intermediate unit 54. The boards, constituting the rear wall of the flap unit, are attached so that they can be swung until they are flush with the rear deck, and both side end portions of the boards are engaged with the respective pillars by means of engaging members. The central portion of the rear wall made up of the boards is reinforced with a reinforcement as required.

Figure 48:
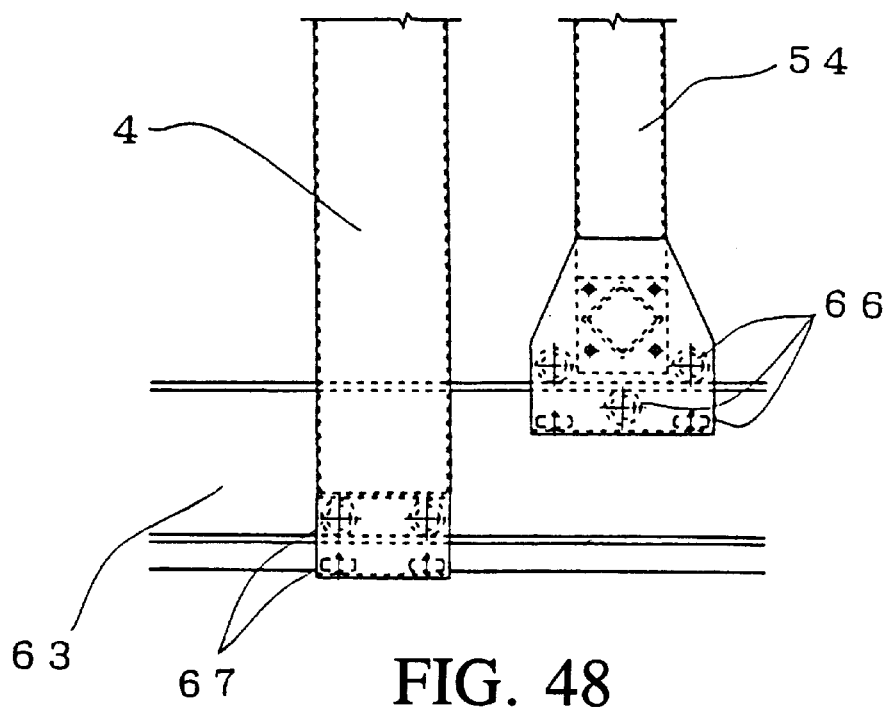

Next, by referring to FIGS. 48 and 49, how the rear deck 30 of this motor-truck 8 is engaged with the intermediate units 4 of the container unit and the intermediate units 54 of the flap unit will be described.

A rail 63 of double structure is provided at both side ends of the rear deck 30, and the upper section of the rail 63 is engaged with the intermediate units 54 of the flap unit, while the lower section of the rail 63 is engaged with the intermediate units 4 of the container unit. The intermediate unit 54 of the flap unit is loaded on the rear deck 30 by means of the two pillars 64, and a beam 65 connects the two pillars with each other at a bottom portion thereof. Wheels 66 are mounted in the bottom portion of the pillar 64 so as to be engaged with the upper section of the rail 63. Wheels 67 are mounted in the bottom portions of the pillars of the intermediate unit 4 of the container unit so as to be engaged with the lower section of the rail 63.

With either of the intermediate unit 54 of the flap unit and the intermediate unit 4 of the container unit, the two pillars, respectively, provided at both side ends of the rear deck 30, are connected to each other with a beam traversing across the rear deck 30, and being configured to sandwich the rear deck 30. Therefore, if these intermediate units are moved along the rear deck 30, they will not be disconnected from the rear deck 30. The end unit of the flap unit and the end unit of the container unit are also engaged with the rail 63 in the same way as are these intermediate units.

It is desirable that the rail 63 be provided with an extension protruding from the rear end of the rear deck 30 to give some play between members which will be required in assembling the intermediate units and the end unit.

When the container unit, which provides an outside container, and the flap unit, which is inside of the container unit are both folded and brought together to the front portion of the rear deck, the motor-truck serves as a plain body vehicle. When only the inside flap unit is assembled, the motor-truck serves as a flap type vehicle when only the outside container unit is assembled, a container type vehicle is provided. When both of the outside container unit and the inside flap unit are assembled, the motor-truck can be used as a compound vehicle of container type and flap type, and vegetables, daily necessaries, scraps, powdery cargoes, and other articles which require a certain degree of strength of the rear deck side walls and must not be moistened by rain can be conveniently transported.

EXAMPLE 5

FIGS. 50 to 54 illustrate another example of the present invention. With this example, a container unit 29 is loaded on the truck 2 of a truck-trailer 1, and a flap unit is loaded inside of the container unit 29 to provide a double-structured cargo containing section.

With respect to the container unit 29, as with the container unit in the example 3, the ceiling and the side walls include a shutter 47, and the rear wall is composed of french doors 22. The basic configuration of the units forming the container unit 29 is the same as that in the example 3, except that three intermediate units 4 are used.

The configuration of the flap unit to be loaded inside of the container unit 29 of the truck-trailer is basically the same as that of the flap unit to be loaded inside the container unit of the truck-trailer as shown in the example 4.

Figure 53:
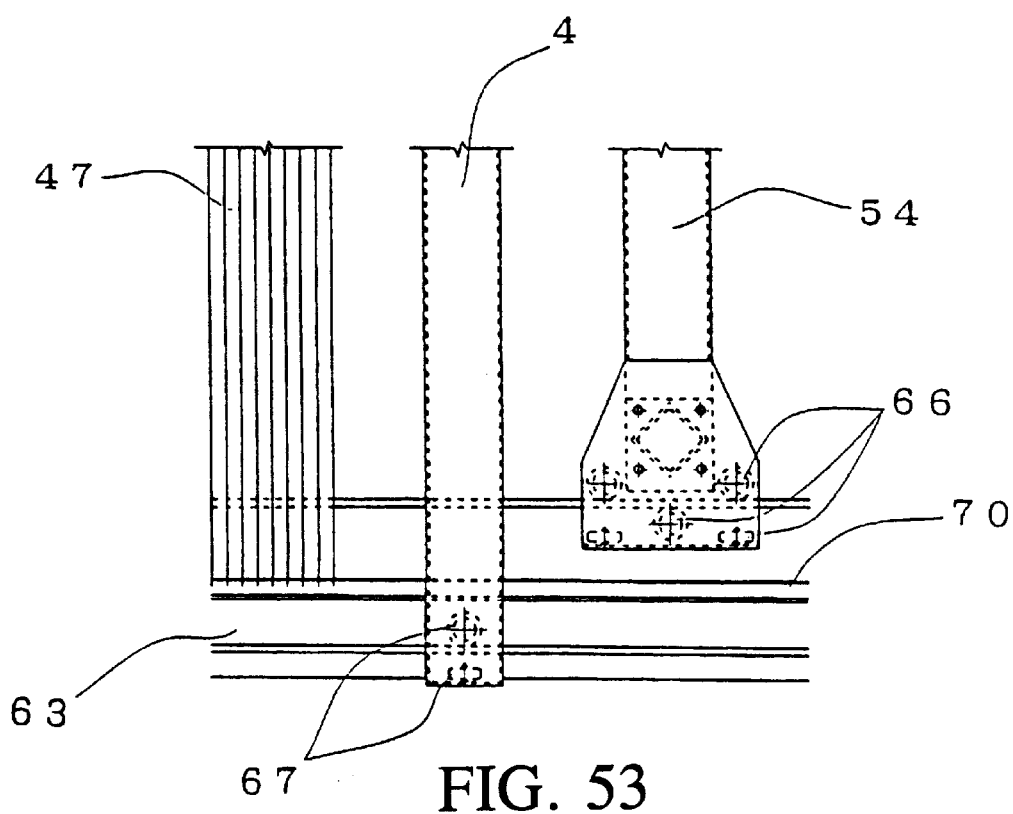
FIGS. 50 to 54 show an example in which a container unit is loaded on the truck of a truck-trailer, and a flap unit is loaded inside of the container unit to provide a double structured cargo containing section.
Figure 50:
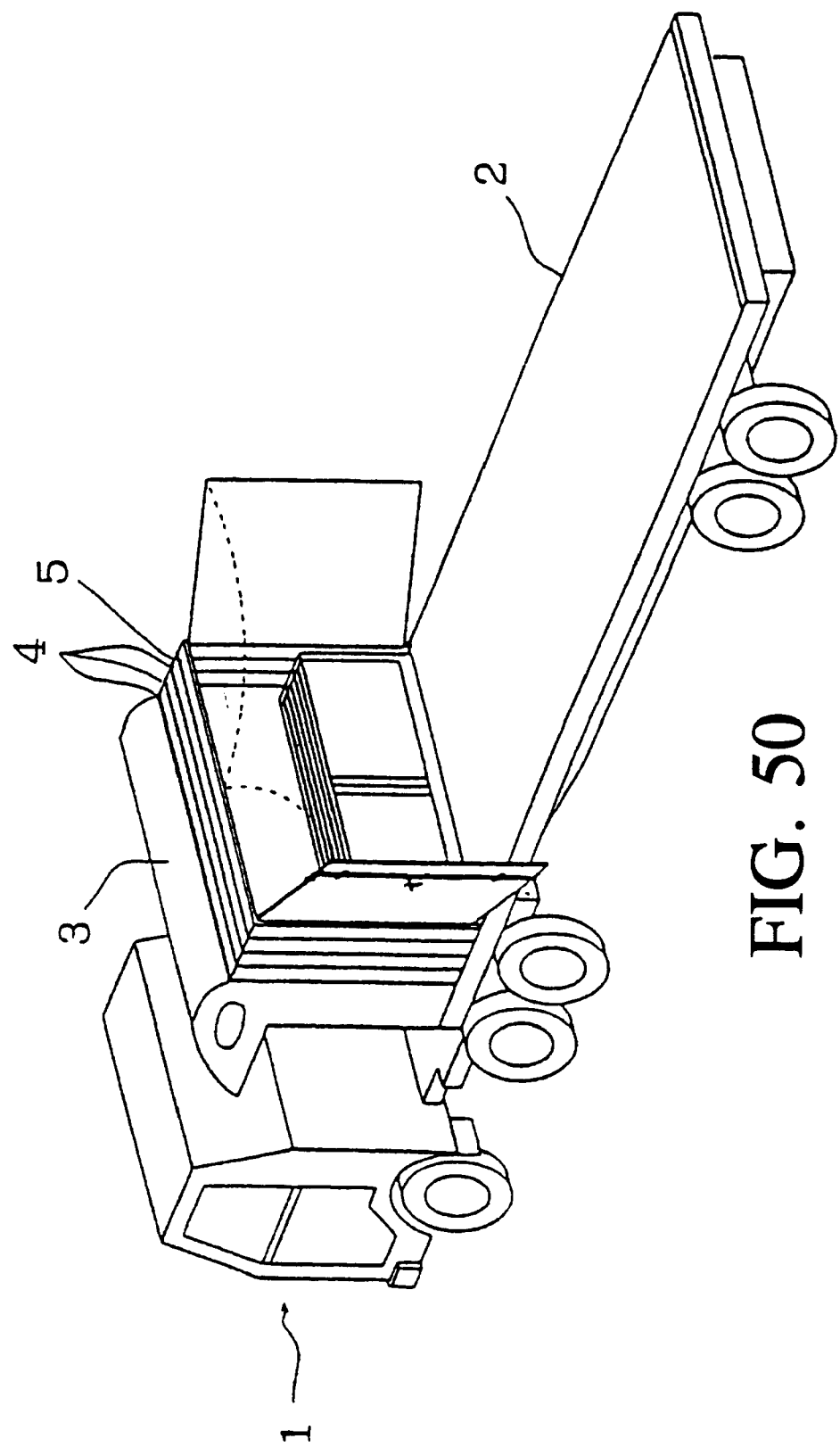
Figure 51:
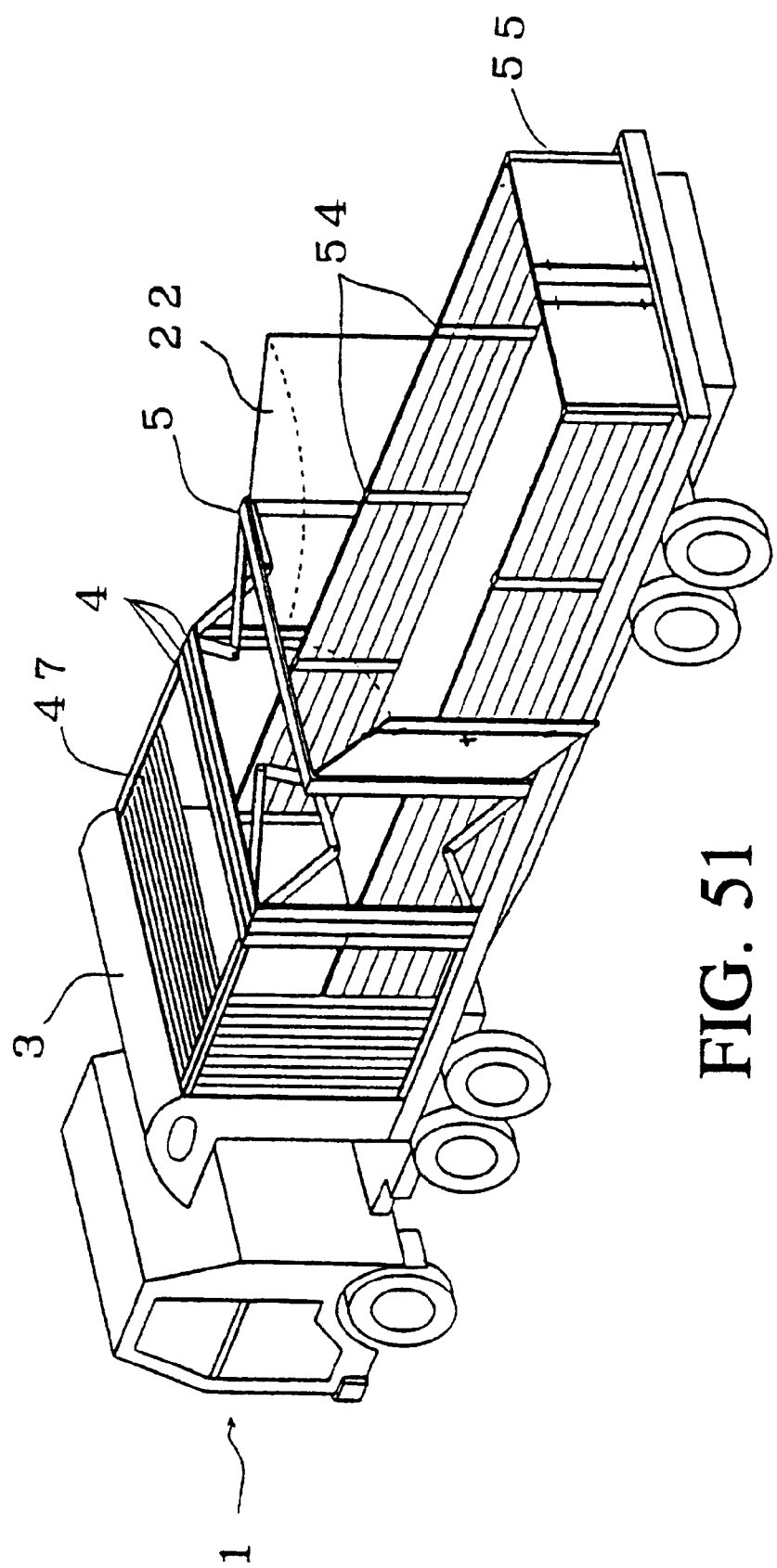
Figure 52:
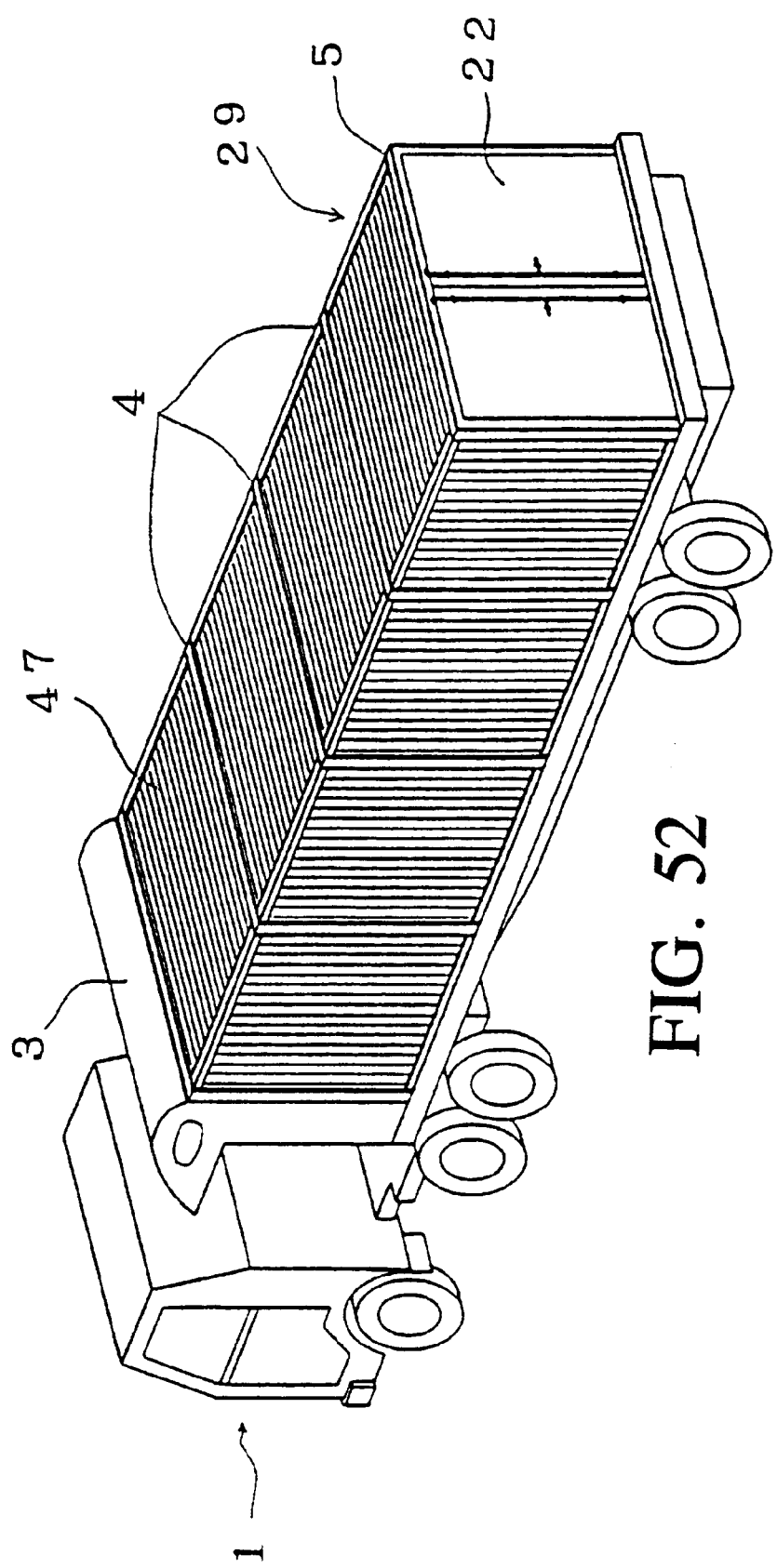

Next, by referring to FIGS. 53 and 54, how the truck 2 of this truck-trailer is engaged with the intermediate units 4 of the container unit and the intermediate units 54 of the flap unit, and the shutters 47 will be described.

A rail 63 of double-structure is provided at both side ends of the truck 2. The upper section of the rail 63 is engaged with the intermediate units 54 of the flap unit, while the lower section of the rail 63 is engaged with the intermediate units 4 of the container unit. The intermediate unit 54 of the flap unit is loaded on the truck 2 by means of the two pillars 64 and the beam 65 connecting of the two pillars 64 with each other in a bottom portion thereof. Wheels 66 are mounted in the bottom portion of the pillar 64 so as to be engaged with the upper section of the rail 63. Wheels 67 are mounted in the bottom portion of the pillars of the intermediate unit 4 of the container unit with engaging members 68 and 69 so as to be engaged with the lower section of the rail 63. A shutter rail 70 to guide the shutter 47 is provided on the engaging member 69.

With either of the intermediate unit 54 of the flap unit or the intermediate unit 4 of the container unit, the two pillars, provided at both side ends of the truck 2, are connected to each other with a beam traversing across the truck 2, and are configured to sandwich the truck 2. Therefore, if these units are moved along the rail, they will not be disconnected from the truck 2. The end unit of the flap unit and the end unit of the container unit are also engaged with the rail 63 in the same way as with the intermediate units.

It is desirable that the rail 63 be provided with an extension protruding from the rear end of the truck 2 to give some play between members which will be required in assembling the intermediate units and the end unit.

EXAMPLE 6

Figure 55:
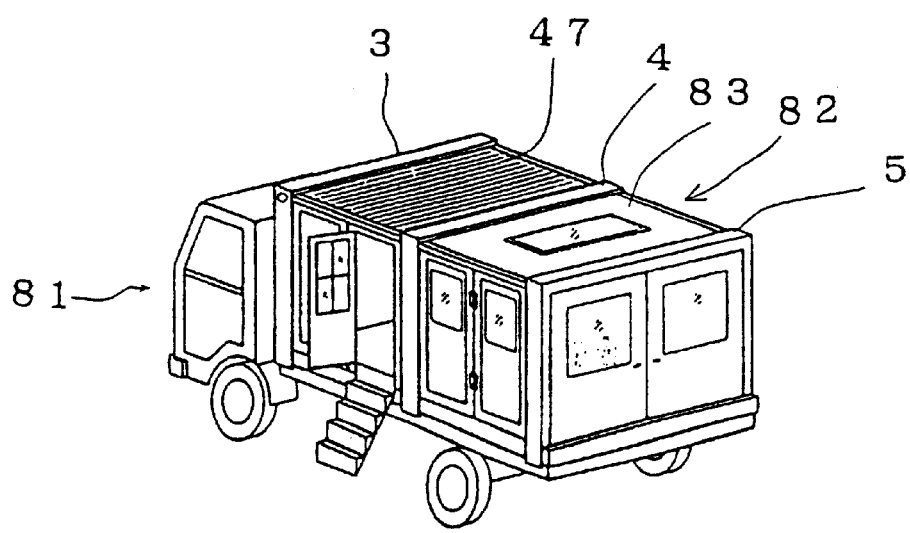
FIG. 55 shows an example in which the present invention is applied to a camper.

FIG. 55 illustrates another example of the present invention, in which the present invention is applied to a camper.

With the living room 82 of the camper 81, the front halt of the ceiling consists of a shutter 47 accommodated in the top unit 3. The rear half of the ceiling is composed of a board 83 having a window made of a reinforced clear plastic. The board 83 is attached to the top beam of the intermediate unit 4 so that the board 83 can be freely swung. The side walls and rear wall of the living room 82 are each formed with boards having a window. The basic configuration of these members is the same as the configuration of the members constituting the container unit of the motor-truck as shown in the example 4. An appropriate design change, such as a part of the side walls of the living room of the camper being formed with a shutter, can, of course, be made.

When the units constituting the living room 82 are folded, the camper can be used as a cargo transporting vehicle of plain body type.

EXAMPLE 7

Figure 56:
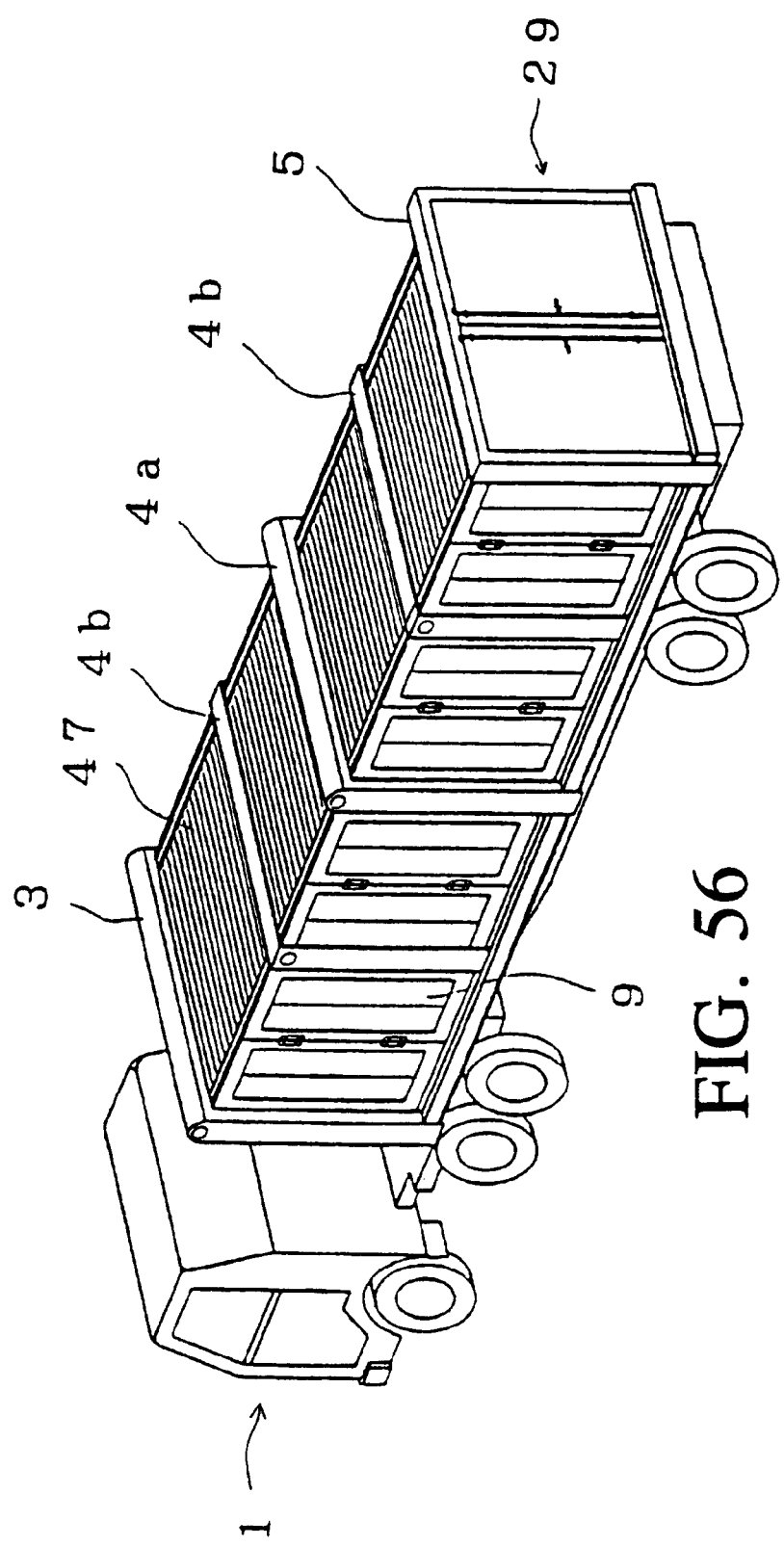
FIGS. 56 to 58 show an example in which a container unit is loaded as a cargo containing section unit on the truck of a truck-trailer.
Figure 57:
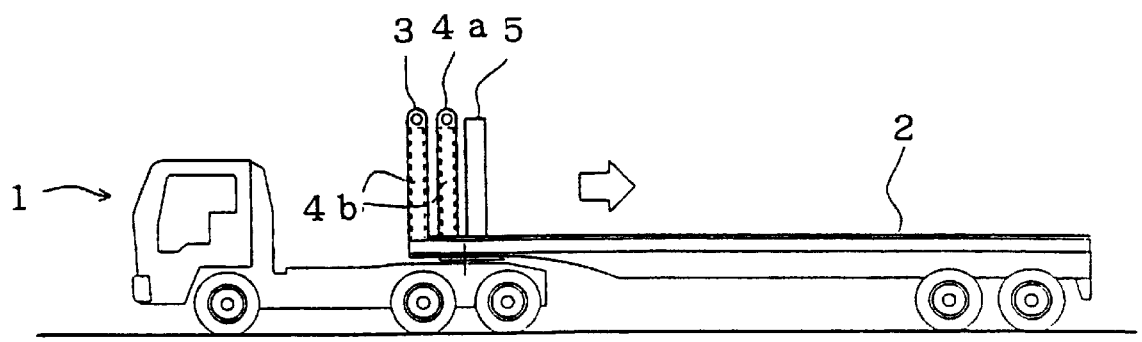
Figure 58:
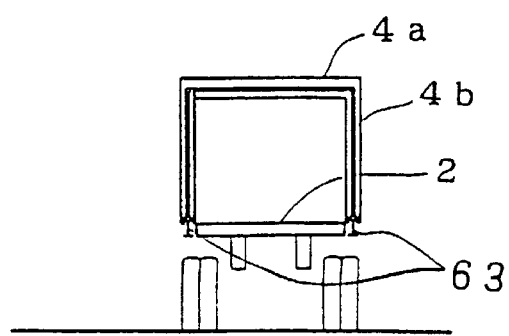
Figure 59:
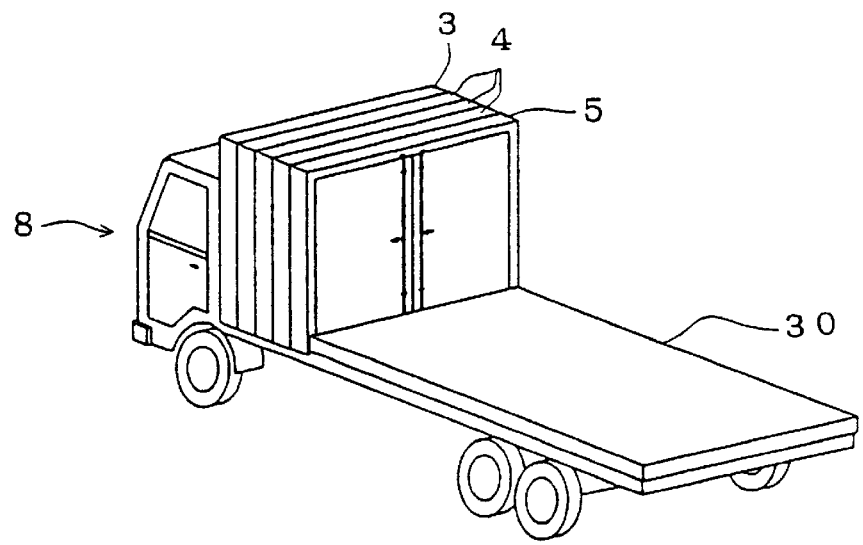
FIGS. 59 to 65 show an example in which a container unit is loaded on the rear deck of a motor-truck, and a flap unit is loaded inside of the container unit to provide a double-structured cargo containing section.
Figure 60:
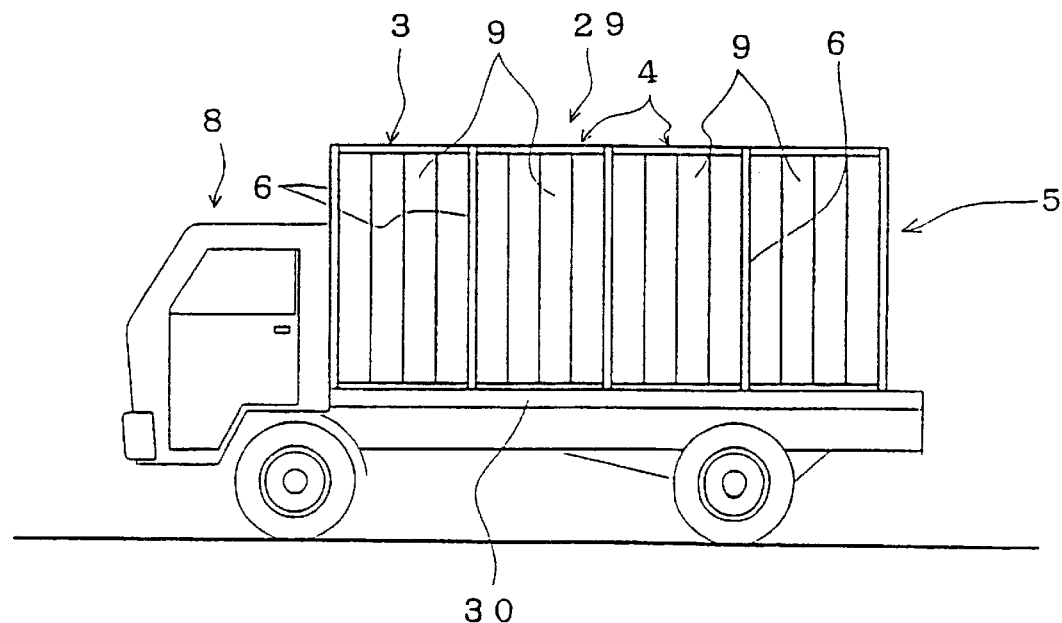
Figure 61:
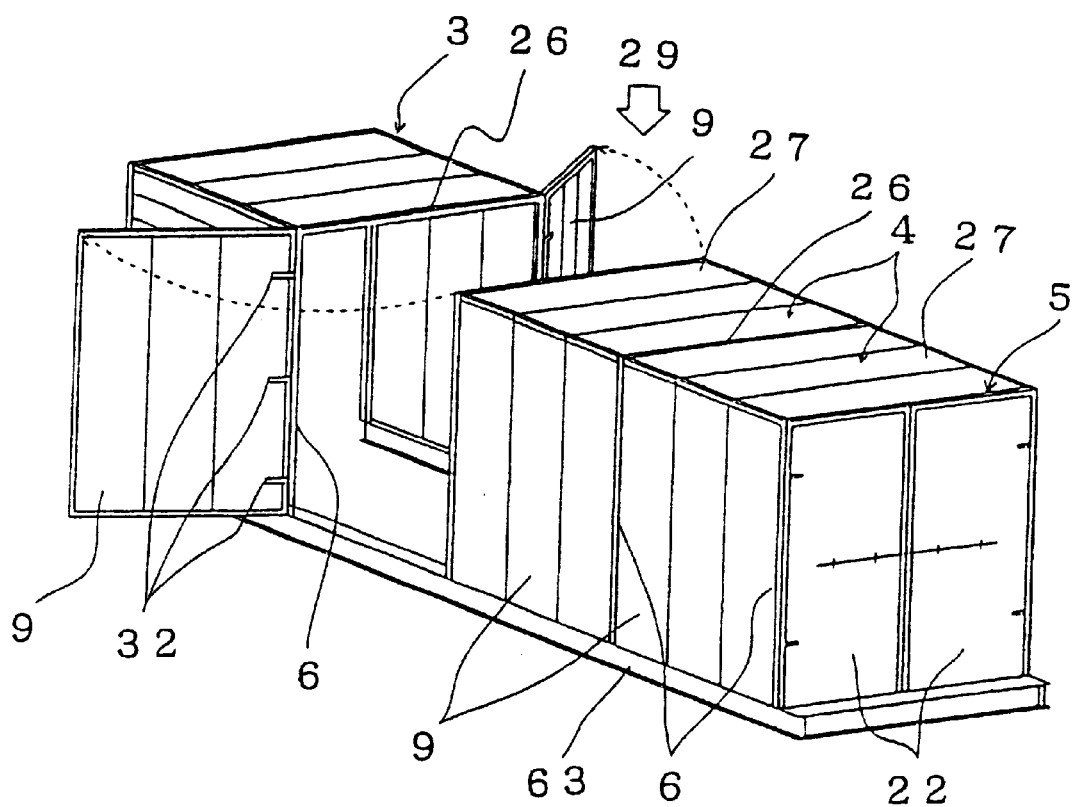
Figure 62:
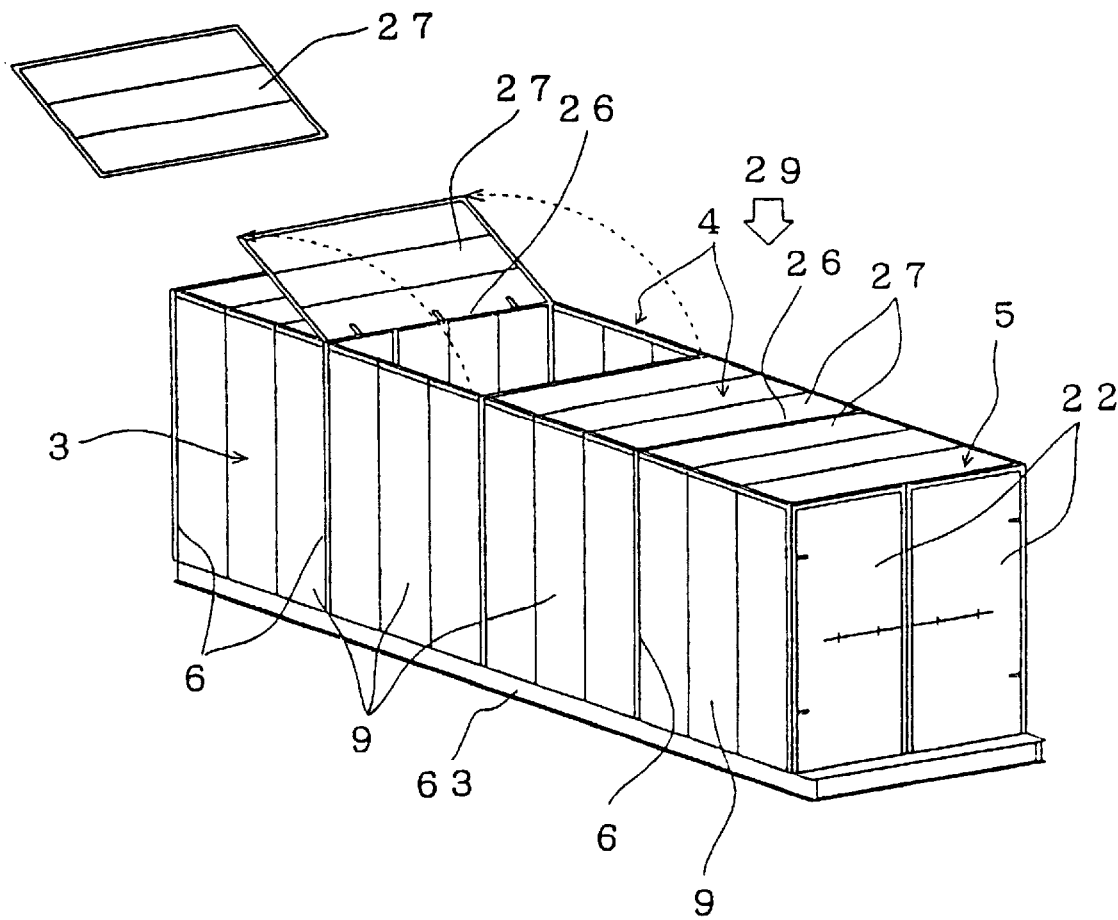

FIGS. 56 to 58 illustrate another example of the present invention. With respect to this example, a container unit 29 is loaded on the truck 2 of a truck-trailer 1.

With respect to the container unit, two types of intermediate units are provided: the outside intermediate unit 4a; and the inside intermediate unit 4b, which is accommodated inside of the outside intermediate unit 4a. As shown in FIG. 58, a rail 63 of double-structure for use as a guide member is provided at both side ends of the truck 2, and the inside intermediate unit 4b is engaged with the upper section of the rail 63, and the outside intermediate unit 4a is engaged with the lower section of the rail 63 so that the rail is sandwiched between wheels.

With respect to the container unit 29, the ceilings of the top unit 3, the inside intermediate unit 4b, and the outside intermediate unit 4a are formed with a shutter 47 accommodated in the respective shutter cases provided in the top portions thereof. The side walls 9 are formed with boards 9 attached to the pillars of the respective units so that the side walls 9 can be freely swung, as with the motor-truck in the example 4.

By being so configured, when the container unit 29 is folded and brought together to the front portion of the truck 2, the inside intermediate unit can be accommodated in the outside intermediate unit 4a (FIGS. 57 and 58). Therefore, the space required for accommodating the container unit can be decreased, and thus the space of the rear deck, when the truck-trailer 1 is used as a plain body vehicle, can be increased.

EXAMPLE 8

FIGS. 59 to 65 illustrate another example of the present invention. With respect to this example, a container unit 29 is loaded on the rear deck 30 of a motor-truck 8, and a flap unit is loaded inside of the container unit 29 to provide a double-structured cargo containing section. The basic configuration of the container unit is the same as that in the example 2. The units constituting the container unit 29 are provided with a strength by connecting the tops of two pillars 6 which are located at both side ends of the rear deck by means of a beam 26. Each wall of the container unit is formed with a board. The container unit is a combination of: one top unit 3, having a side wall 9 attached to the pillar 6, and having the ceiling member 27 connected to the beam 26 so that the side wall 9 and the ceiling member 27 can both be freely swung; three intermediate units 4, which have the same configuration as that of the top unit; and one end unit 5 having french doors 22 attached to the pillars 6. so that the french doors 22 can freely be swung (See FIGS. 61 and 62). Wheels (not shown) are provided in the bottom portion of the pillar 6 of these units so as to be engaged with a rail 63 for use as a guide member located on either side of the rear deck 30 of the motor-truck for allowing movement of the units.

There is no particular limitation for the materials of the pillars, beams, side walls, ceiling members and others composing the container unit. Normally, the pillars and beams are made of a metal with a high strength such as iron and steel, and the side walls 9 and ceiling members 27 are made of either a light metal such as aluminum, or a reinforced plastic. The number of intermediate units 4 can be increased or decreased depending upon the size of the rear deck.

Figure 63:
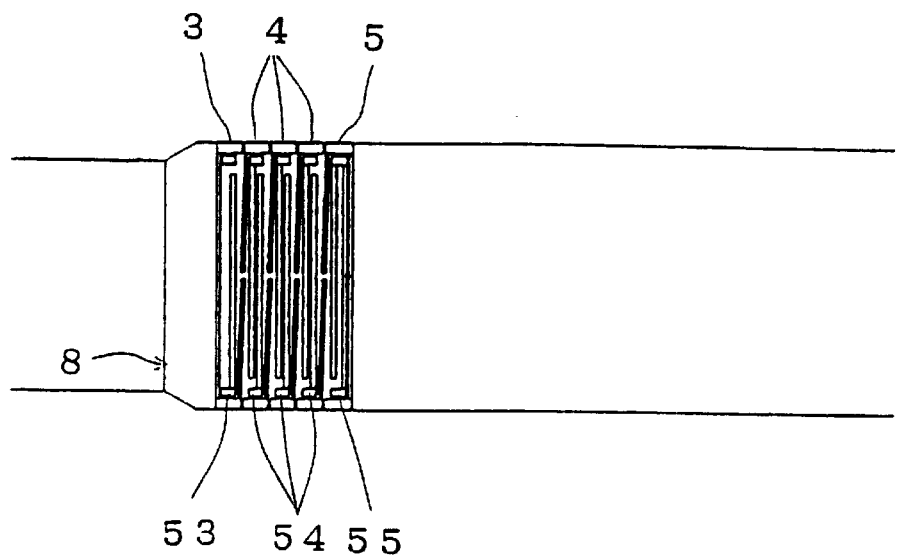
Figure 64:
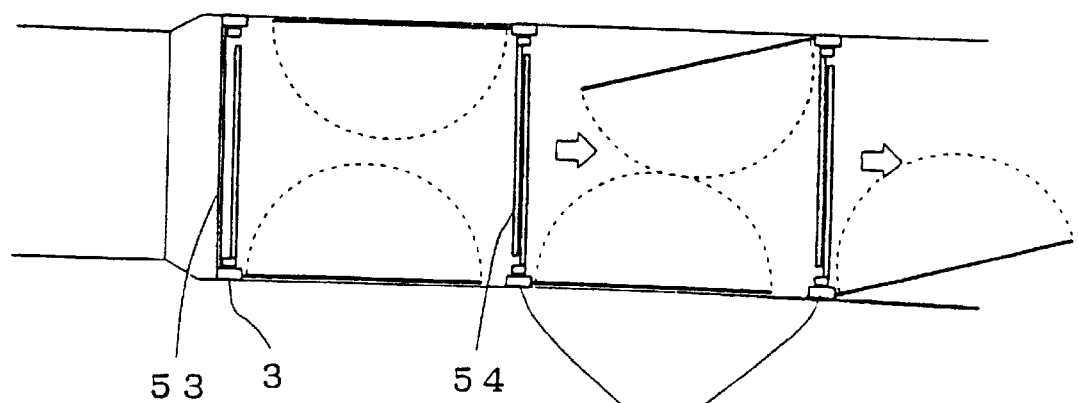
Figure 65:
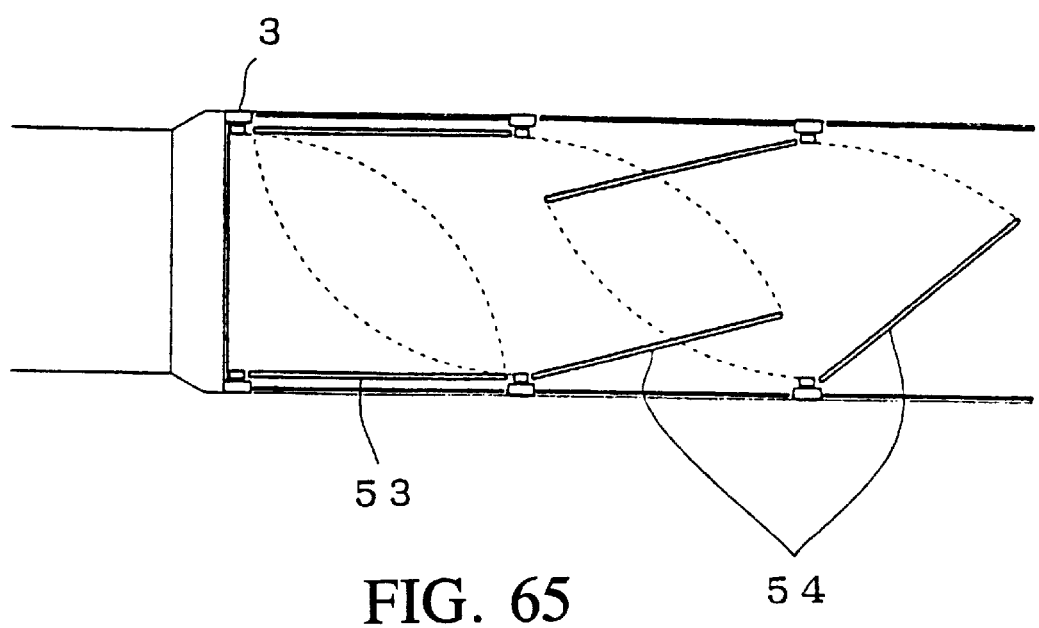

Flap units 53, 54, and 55 that can be moved on the rear deck, are loaded inside of the container unit 29 so that the cargo containing section is double-structured (See FIGS. 63 and 64). The basic configuration of the flap unit is the same as that in Example 4.

When the outside container unit and the inside flap unit are both folded and brought together to the front portion of the rear deck, the motor-truck serves as a plain body vehicle. When only the inside flap unit is assembled, the motor-truck serves as a flap type vehicle, while when only the outside container unit is assembled, a container type vehicle is provided. When both of the outside container unit and the inside flap unit are assembled, the motor-truck can be used as a compound vehicle of container type and flap type.

As stated above, the cargo transporting vehicle of the present invention can be changed in form by itself to the plain body type, the flap type, the container type, the camper or the compound vehicle of flap type and container type, depending upon the type of cargoes to be loaded thereon. Thus, there is no need for preparing various vehicles to suit to the types of cargoes. The need for idle running can be minimized, resulting in an improvement in operation efficiency and transportation efficiency. Further, the cargo transporting vehicle of the present invention contributes to prevention of a traffic jam and reduction of the exhaust gas into the environment, thus the present invention provides an extremely high value of practical use, especially when it is used as a compound type vehicle, so that vegetables, daily necessaries, scraps, powdery cargoes, and other articles, which are required to be carried in a truck having a rear deck side walls of a certain degree of strength and which must not be moistened by rain, can be conveniently transported. In addition, cargoes can be freely loaded and unloaded from the sides and top, resulting in an improved workability in transportation.

I claim:

1. A cargo transporting vehicle comprising:
    a cargo loading platform defining a top end, a rear end and two sides;
    a flap unit capable of being freely loaded and unloaded, the flap unit comprising:
        a top unit installed on the top end of the platform,
        an end unit installed on the rear end of the platform, and
        at least one intermediate unit installed between the top unit and the end unit; and
    a guide member for guiding the flap unit, the guide member extending from the top end to the rear end along the two sides of the platform,
    wherein two pillars of the flap unit disposed at the two sides of the platform are connected by a beam at a bottom portion of the pillars.

2. The cargo transporting vehicle of claim 1, wherein the flap unit comprises a board attached to the pillar and/or the beam of the top unit, the end unit or the intermediate unit, and the board can be pivotally swung.

3. The cargo transporting vehicle of claim 2, wherein the flap unit comprises a board attached to the pillar and/or the beam of any of the top unit, the end unit or the intermediate unit, and the board can be pivotally swung at the bottom portion outward from the platform.

4. The cargo transporting vehicle of claim 2 or 3, wherein each intermediate unit comprises:
    two pillars located at the two sides of said cargo loading platform,
    a beam connecting said pillars to each other, and
    a side wall one side end of which is connected to one of said pillars so that said side wall can be pivotally swung, and the other end of said side wall can be engaged with a pillar of an adjacent unit, and said side wall is connected to one another in sequence at said pillars of said intermediate unit to form a flap unit.

5. The cargo transporting vehicle of claim 1, wherein a double rail member is provided at said sides of said cargo loading platform, and said flap unit is movably engaged with an inside rail of said double rail member, while a container unit is movably engaged with an outside rail of said double rail member.

6. The cargo transporting vehicle of claim 5, wherein said container unit comprises:
    a top unit, which is installed on the X side,
    an end unit, which is installed on the rear side, and
    at least one intermediate unit which is installed between said top unit said end unit.

7. The cargo transporting vehicle of claim 6, wherein each of said top unit, said end unit and said intermediate unit comprising:
    two pillar s located at said sides of said cargo loading platform, and a beam connecting said pillars to each other.

8. The cargo transporting vehicle of claim 7, wherein said container unit comprises boards attached to said pillars and/or said beam so that said boards can be pivotally swung.

9. The cargo transporting vehicle of claim 7, wherein said container unit comprises a shutter.

10. The cargo transporting vehicle of claim 9, wherein said shutter is accommodated in said top unit.

11. The cargo transporting vehicle of claim 10, wherein said shutter is accommodated in said intermediate unit.

12. The cargo transporting vehicle of claim 9, wherein said pillars of top unit, said end unit or said intermediate unit are connected with pillars of an adjacent unit by means of folding connecting members.

13. The cargo transporting vehicle of claim 7, wherein said walls of said container unit are formed with shutters and boards attached to said pillars and/or said beams so that they can be pivotally swung.

* * * * *

UNITED STATES PATENT AND TRADEMARK OFFICE
CERTIFICATE OF CORRECTION

PATENT NO. : 6,196,786 B1
DATED : March 6, 2001
INVENTOR(S) : Shinohara

It is certified that error appears in the above-identified patent and that said Letters Patent is hereby corrected as shown below:

Drawings,
Replace FIG. 10 with the attached.

Column 7,
Line 43, change "he" to -- the --.

Column 8,
Line 4, change "unit S" to -- unit 5 --.

Column 18,
Line 26, change "X side" to -- top side --.
Line 29, between "unit" and "said", insert -- and --.
Line 33, change "pillar s" to -- pillars --

UNITED STATES PATENT AND TRADEMARK OFFICE
CERTIFICATE OF CORRECTION

PATENT NO.   : 6,196,786 B1
DATED        : March 6, 2001
INVENTOR(S)  : Shinohara It is certified that error appears in the above-identified patent and that said Letters Patent is hereby corrected as shown below:

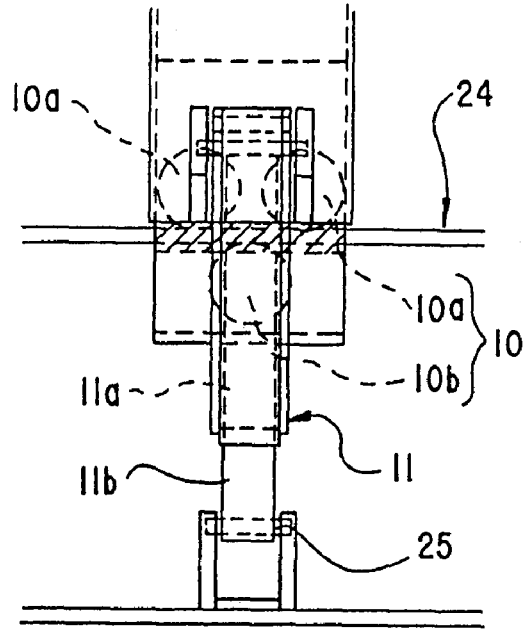

FIG.10

Signed and Sealed this

Seventeenth Day of September, 2002

*Attest:*

*Attesting Officer*

JAMES E. ROGAN
*Director of the United States Patent and Trademark Office*